Nov. 16, 1948.   C. C. SLATE   2,453,869
BOMB-CARRYING APPARATUS FOR AIRCRAFT
Filed Aug. 1, 1941   8 Sheets-Sheet 1

INVENTOR
CLAUDE C. SLATE
BY HARRIS, KIECH, FOSTER & HARRIS
FOR THE FIRM
ATTORNEYS

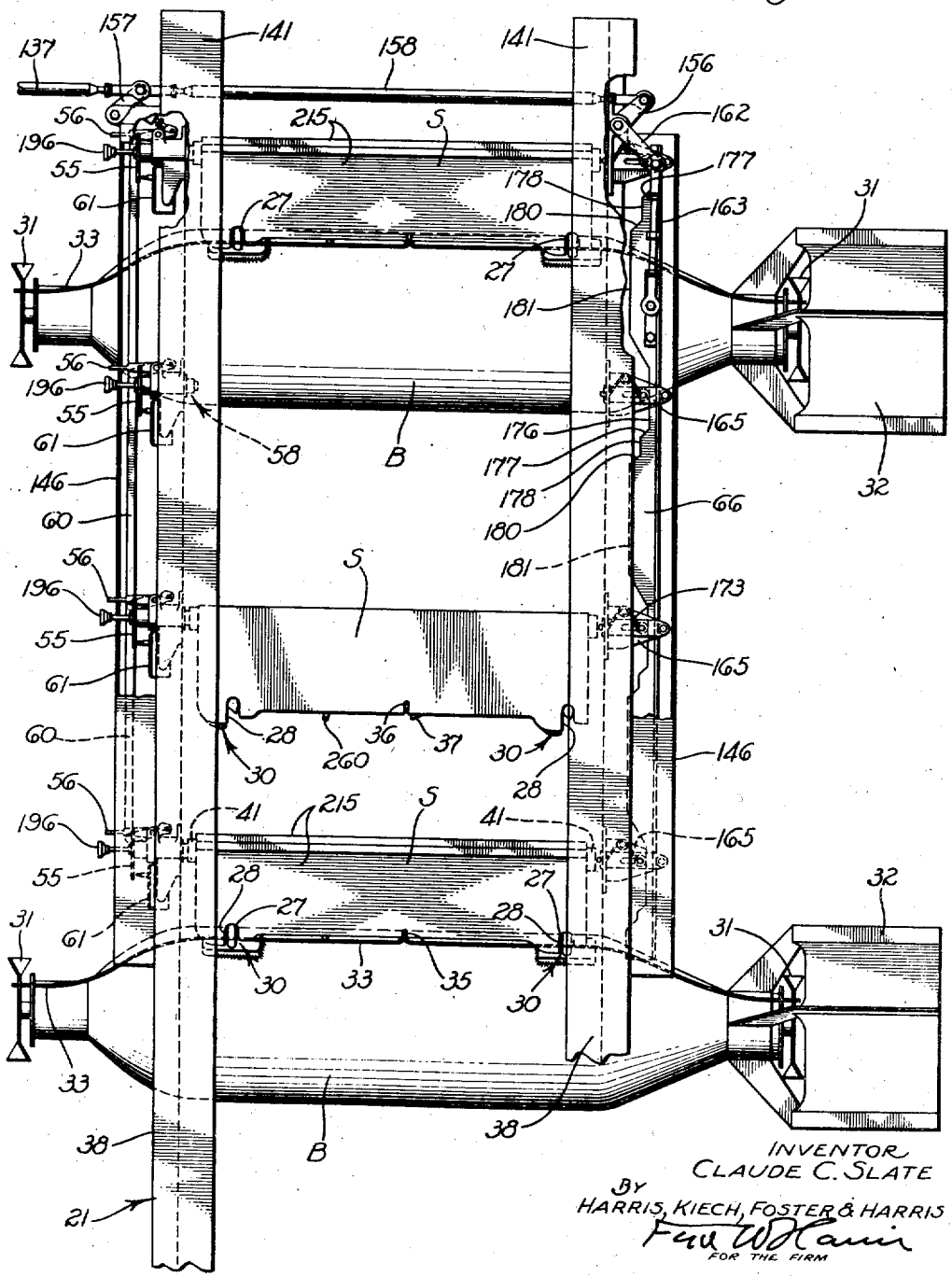

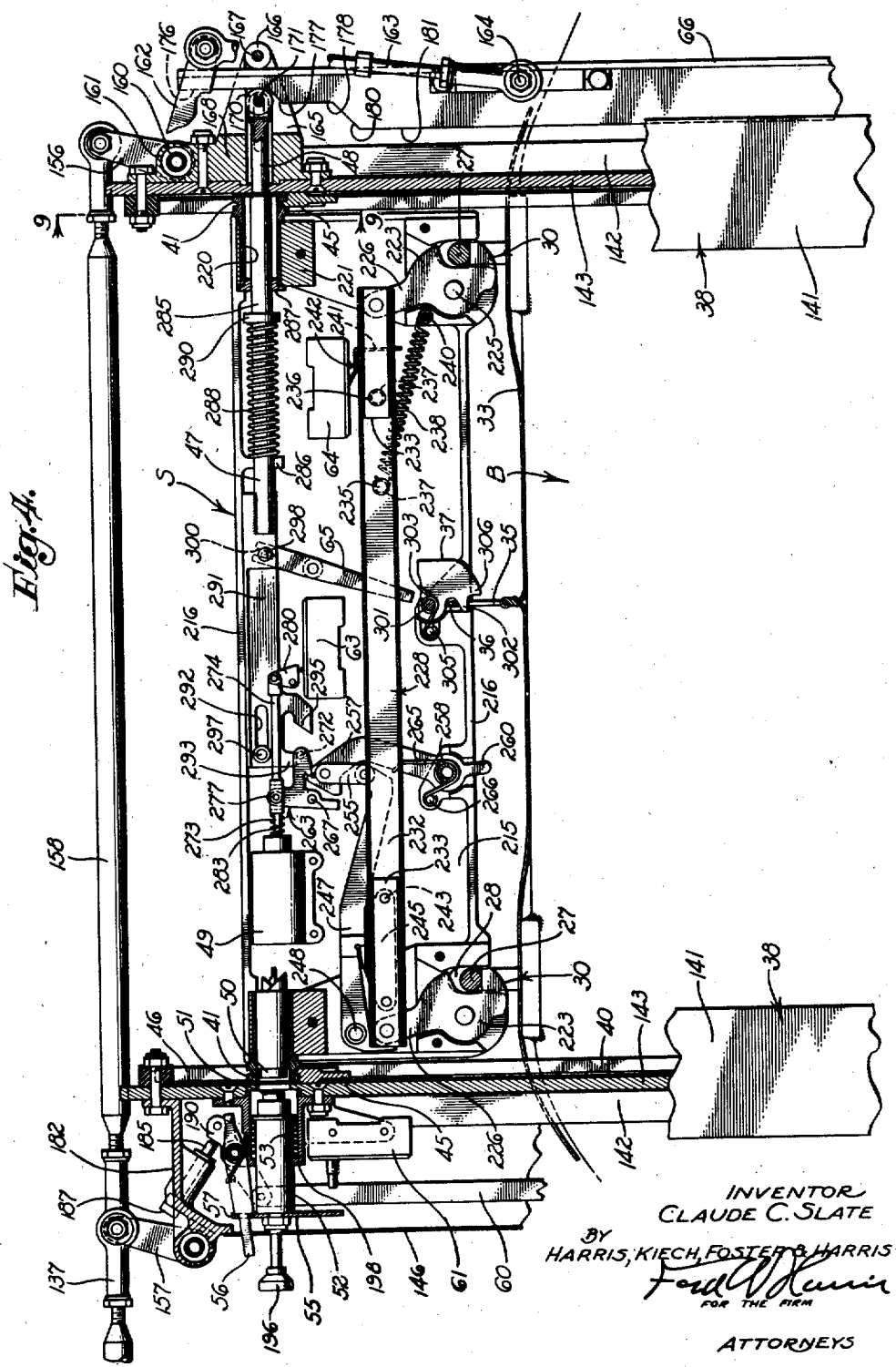

Nov. 16, 1948.   C. C. SLATE   2,453,869
BOMB-CARRYING APPARATUS FOR AIRCRAFT
Filed Aug. 1, 1941   8 Sheets-Sheet 4
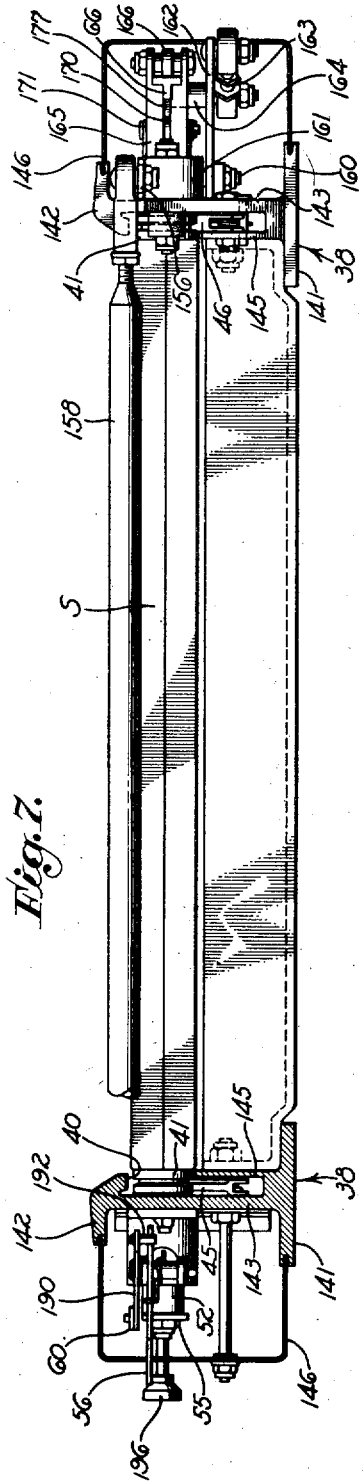
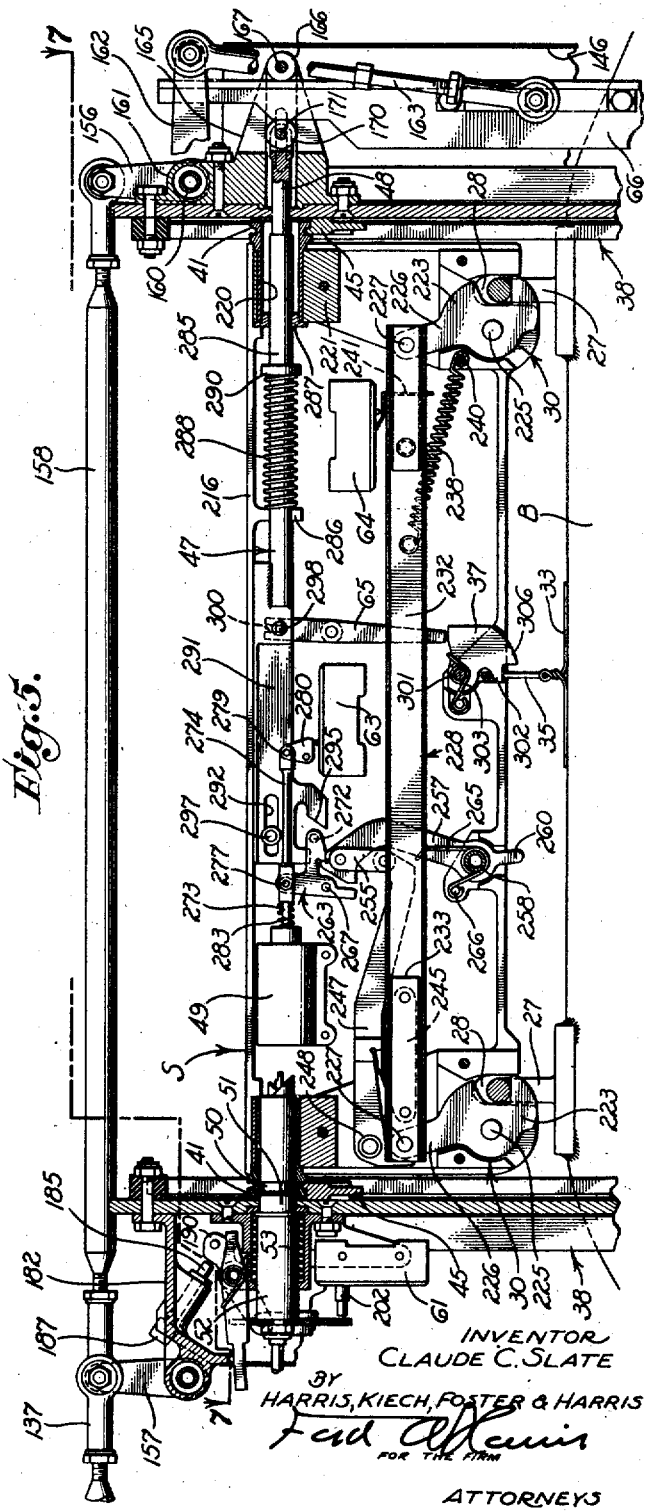
INVENTOR
CLAUDE C. SLATE
BY
HARRIS, KIECH, FOSTER & HARRIS
ATTORNEYS

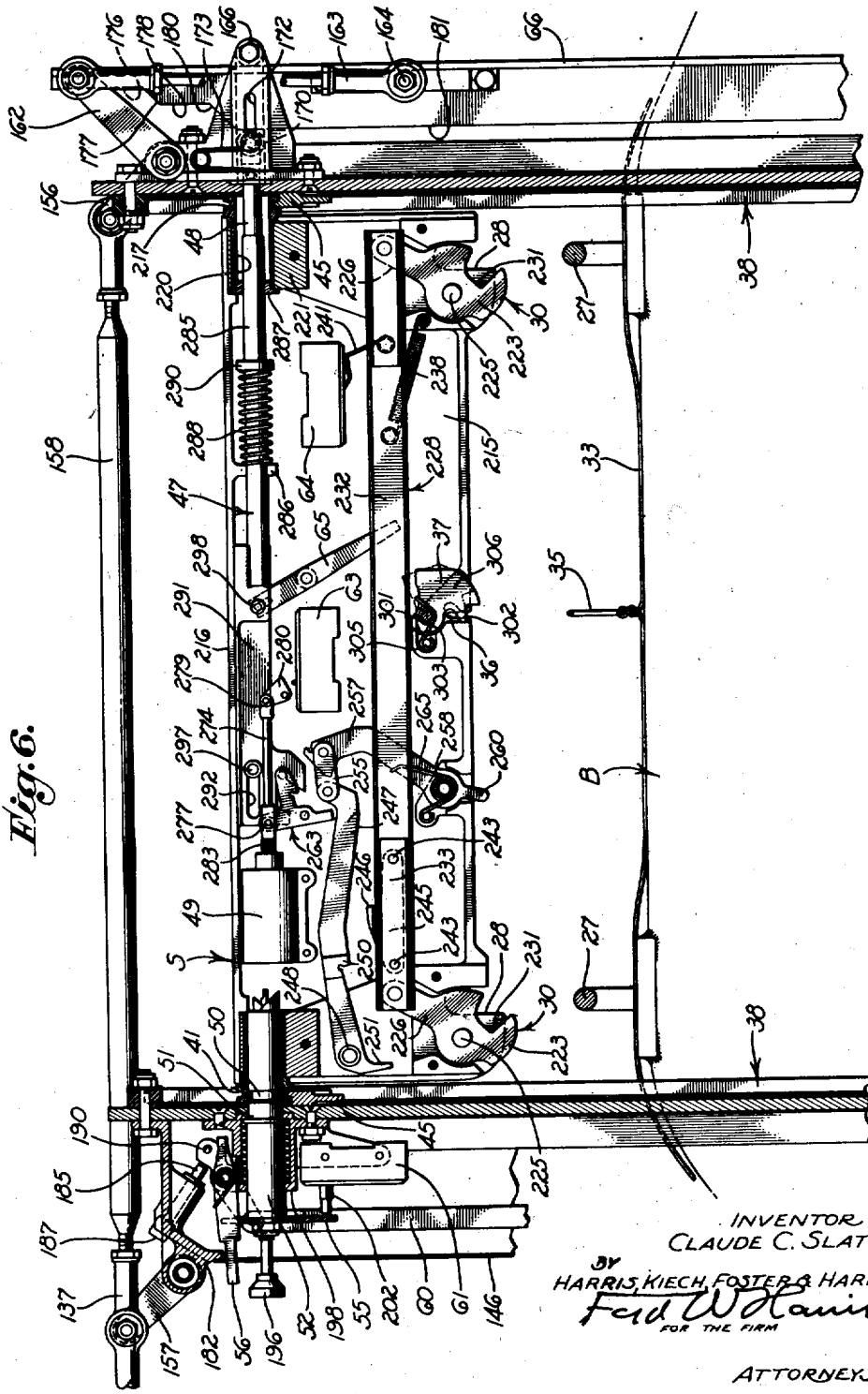

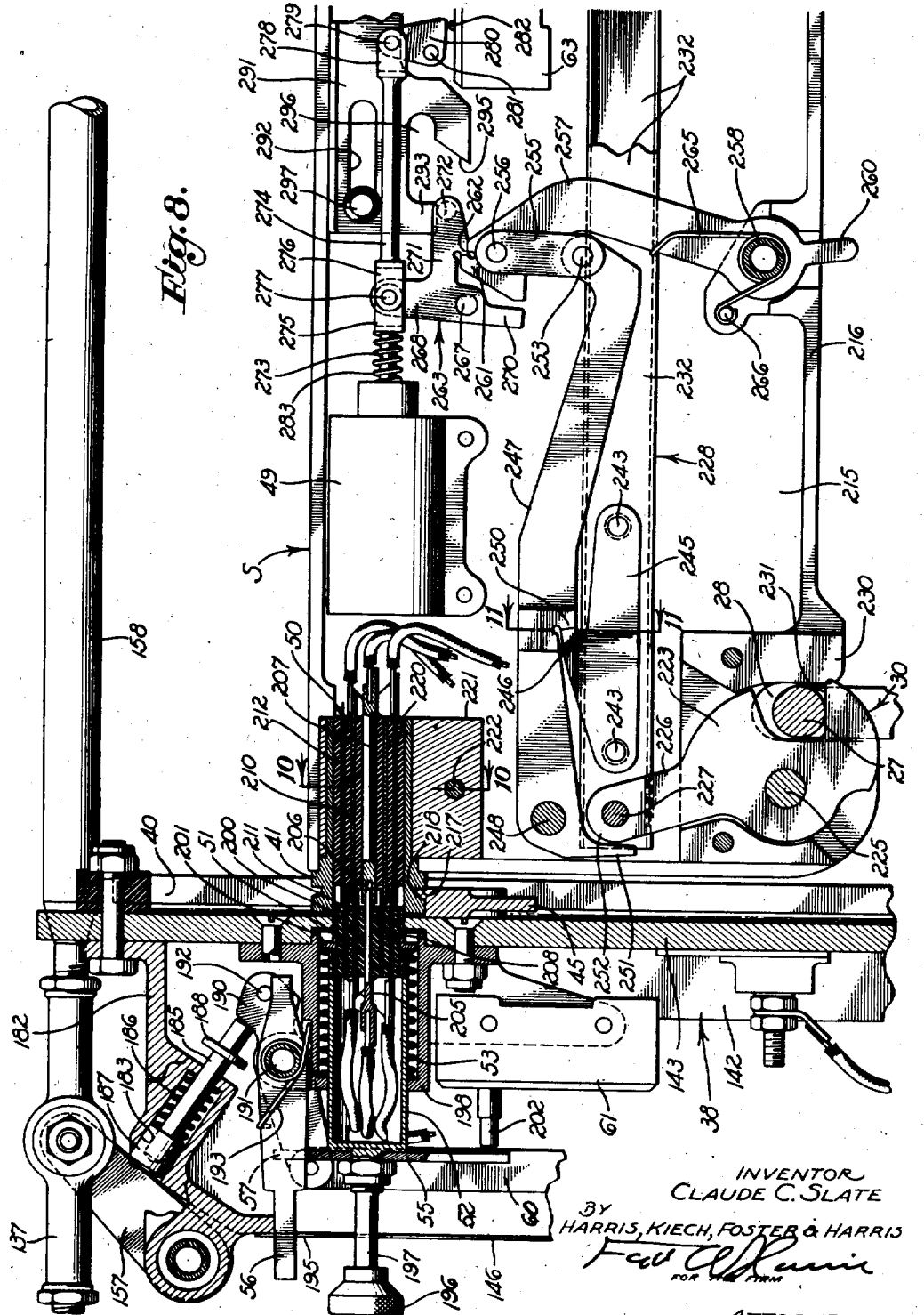

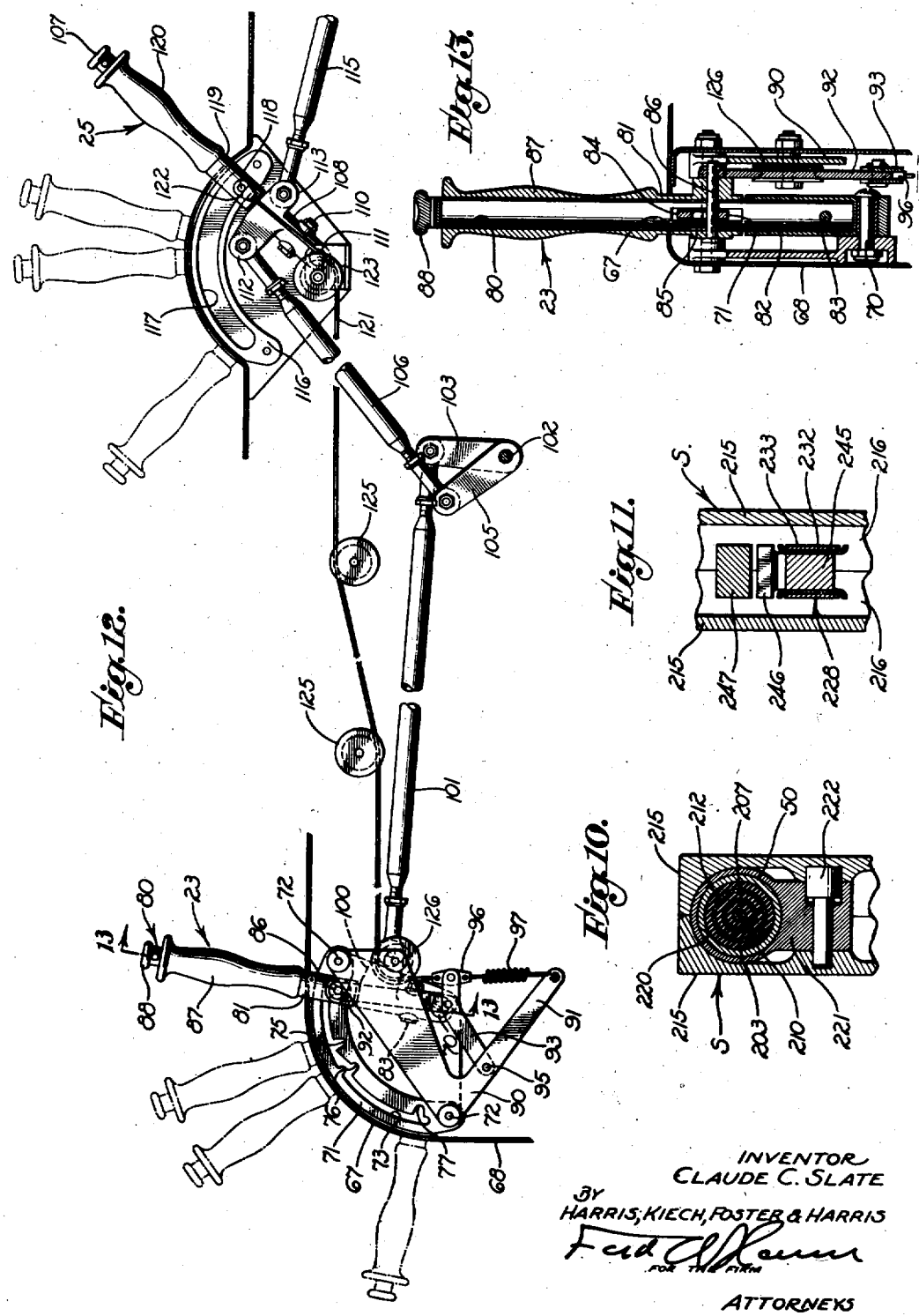

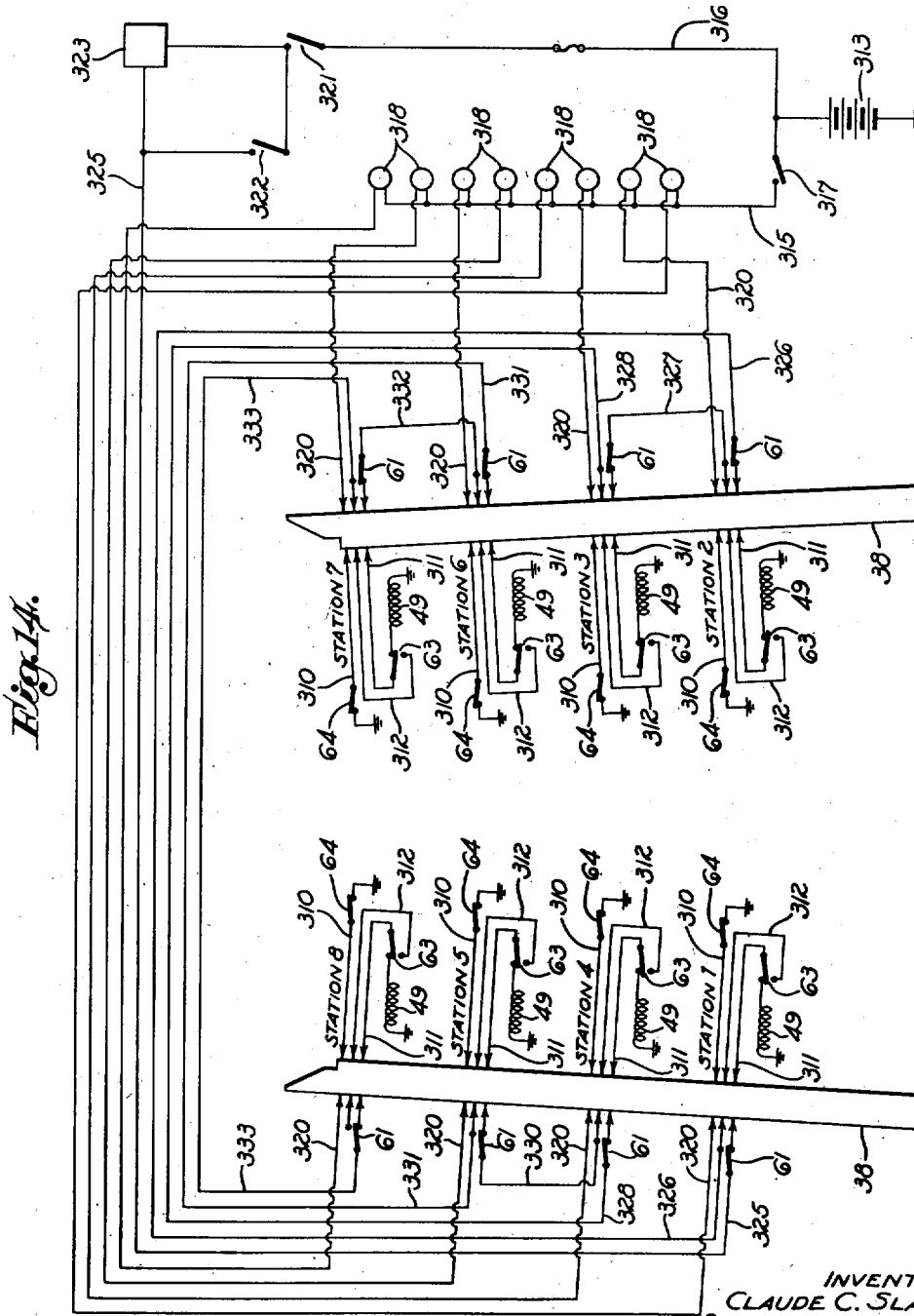

Patented Nov. 16, 1948

2,453,869

UNITED STATES PATENT OFFICE 2,453,869

BOMB-CARRYING APPARATUS FOR AIRCRAFT

Claude C. Slate, Burbank, Calif., assignor to Hughes Tool Company, Houston, Tex., a corporation of Delaware Application August 1, 1941, Serial No. 405,010

54 Claims. (Cl. 89—1.5)

The present invention is directed to an apparatus commonly known as a bomb rack together with associated mechanism employed in an aircraft for transporting and releasing aerial bombs.

The general object of the invention is to provide a bomb-carrying apparatus that affords a rapid and fool-proof loading procedure requiring little skill, that is both simple and dependable in flight operation, and that may be inspected, serviced, and repaired to a major extent with exceptional convenience and without loss of flying time.

With reference to loading an airplane with bombs, the various procedures heretofore followed all involve considerable manual effort and afford so many opportunities for serious oversight that only highly trained and proven personnel may be employed. For example, the loading crew is usually placed under the mental burden of remembering to cock release mechanisms for individual bombs, which mechanisms would otherwise be inoperative to release the bombs during flight. One of the important objects of my invention is to achieve a substantially foolproof apparatus that imposes on the loading crew in an inescapable manner all of the steps essential to prepare the apparatus for efficient operation in flight. It is contemplated that the apparatus will, in effect, lead even inexperienced men to follow an ideal procedure and will absolutely preclude any difficulties in the course of flight or bombing operations arising from prior ineptness or negligence on the part of the loading crew.

A bomb-carrying apparatus of the general type under consideration includes a support or frame in the bomb bay of an airplane and includes shackles adapted for removable mounting on the frame at spaced shackle stations thereon. In the loading procedure the shackles are first engaged with the bombs and then the bombs are hoisted for attachment of the shackles at the shackle stations of the frame in the aircraft. Heretofore substantially the whole of the mechanism for controlling and effecting the release of bombs has been incorporated in the permanently installed apparatus in the aircraft, the older shackles being simple linking members with relatively few movable parts. One conception characterizing my invention is that certain advantages may be achieved by incorporating important parts of the control mechanism in each shackle. In other words, instead of employing relatively simple shackles in cooperation with complicated control means permanently installed at the various shackle stations in the aircraft, I propose to transfer important elements of the control and release mechanism to the shackle itself and thereby permit simplification of the permanently installed mechanical structure at the shackle stations.

One object of the invention, then, is to provide interchangeable self-sufficient shackle units of rugged and efficient construction and to provide suitable cooperating structure in the airplane. One advantage of such an arrangement is that important parts of the control mechanism may be inspected, serviced, and repaired apart from the aircraft and without taking the aircraft out of action.

With reference to saving labor and with special reference to imposing a foolproof procedure on the loading crew, I propose to provide various automatic and interlocking steps in the procedure of loading and preparing a bombing plane for action. More specifically, some of these objects include: to adapt the shackle units for engagement with the bombs in response to manual movement of the shackle units against the bombs; to provide for cocking of the release mechanism in response to the same movements of the shackle units against the bombs; to provide a mechanism that cannot remain in its engagement position without being at the same time properly cocked for subsequent operation during flight; and to provide for automatic engagement of the shackle units with the supporting frame in the aircraft in response to movement of the shackle units to the stations.

Also included in this group are certain objects relating to a control circuit for operating the shackle units. It is essential that each shackle unit be connected into the control circuit for operative response thereto, and it is further essential that the control circuit be effective to release bombs in proper sequence regardless of whether or not the shackle units are omitted from the supporting apparatus and regardless of whether or not the bombs are absent from shackle units at shackle stations. One object here is to provide for automatic electrical connection of the control circuit with each shackle unit in the course of preparing the aircraft for flight. Another object is to provide automatic switches responsive to shackle units and responsive to engagement means in the shackle units whereby the control circuit is automatically adjusted to the number and distribution of bombs on the aircraft.

Other objects relate to operation of the apparatus in the course of flight. In a control system widely employed heretofore, one control member at the bombardier's station is adjustable to cause a bomb to be armed or disarmed, and a second control member at the bombardier's station operates to release the bomb. In such a system a duplicate control member for controlling release of bombs is at the pilot station, but the pilot is afforded no control for arming and disarming the bombs. One object of the present invention is to eliminate the necessity for a separate manual control for the arming and disarming of bombs and to make such arming and disarming entirely automatic. In the particular illustrative arrangement to be described hereinafter, a single control at the bombardier's station is movable from a normal position to a firing position and to an emergency release position, and automatic means is provided to cause bombs to be armed only when dropped while the control means is at the firing position. Another object of the present invention is to provide a control system that is fully responsive to control means at two or more stations, whereby the pilot as well as the bombardier may have complete control over the bombs.

The above and other objects and advantages of the invention will be apparent in the more detailed description to follow, taken with the accompanying drawings.

In the drawings, which are to be regarded as illustrative only:

Fig. 3 is a side elevation of the apparatus on an enlarged scale, part of the structure being broken away;

Fig. 4 is a view partly in elevation and partly in section showing a shackle unit mounted on the frame in engagement with a bomb, the shackle unit being electrically disconnected;

Fig. 5 is a similar view showing the shackle unit electrically connected to the control circuit on the airplane with the shackle mechanism in firing position;

Fig. 6 is a similar view of the shackle releasing an unarmed bomb in an emergency;

Fig. 7 is a view partly in section and partly in plan taken as indicated by the irregular line 7—7 of Fig. 5;

Fig. 8 is a sectional view on an enlarged scale of a portion of the shackle unit mechanism just after the bomb bay doors are closed;

Fig. 10 is a fragmentary section taken as indicated by the line 10—10 of Fig. 8;

Fig. 11 is a fragmentary section taken as indicated by the line 11—11 of Fig. 8;

Fig. 12 is a view in side elevation showing two interlocked handles for dual control;

Fig. 13 is an enlarged section taken as indicated by the line 13—13 of Fig. 12; and Fig. 14 is a wiring diagram of a control circuit that may be employed in the practice of the invention.

The general arrangement

An understanding of the invention may be approached by initially describing the preferred form of the invention in a general manner and later describing the details of the construction.

Figure 1:
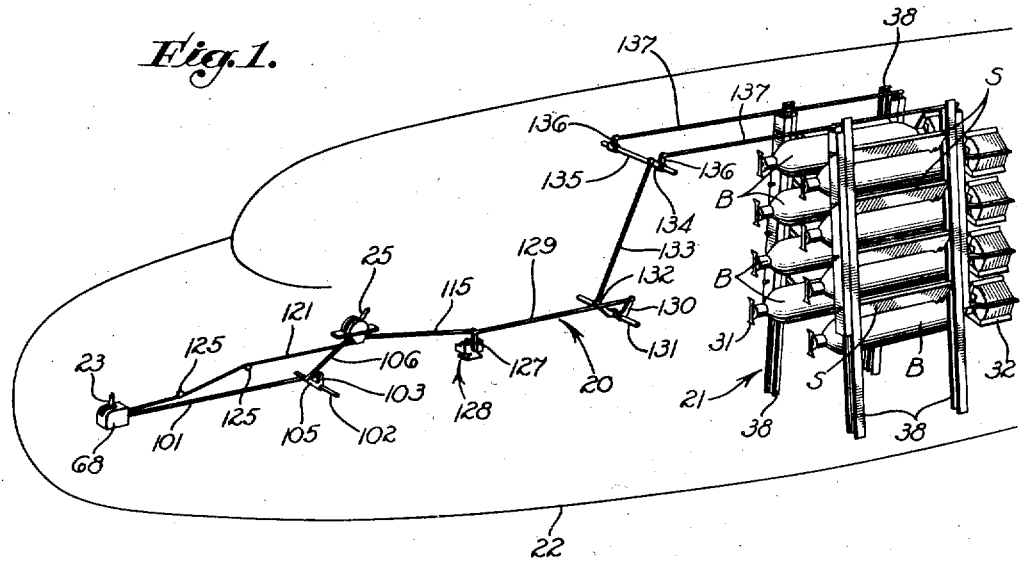
Fig. 1 is a diagramatic view in perspective showing my bomb control apparatus and associated mechanism installed in an aircraft.

Fig. 1 shows a forward control linkage generally designated 20 leading rearward to a support means in the form of a frame generally designated 21 in the bomb bay of the airplane fuselage 22, and shows eight bombs B held by individual shackle units S at eight shackle stations on the frame. The mechanical linkage 20 which may be controlled either by a bombardier's lever 23 or in emergency by a pilot's lever 25 is movable to four dispositions, namely: a normal disposition at which the doors 26 (Fig. 2) of the bomb bay are closed and all of the bombs are locked against release, the arrangement being such that any bomb accidentally released will be released in unarmed state; a door-opening position at which the bomb release mechanism is still locked; a firing disposition at which the doors 26 of the bomb bay are open and the shackle units are unlocked to permit operation for release of the bombs in armed state in response to a control circuit; and an emergency disposition toward which the linkage may be shifted while the doors of the bomb bay are still open to release the bombs consecutively from the shackle units in unarmed state.

As shown in Fig. 3, each of the bombs B has a pair of spaced metal support loops 27 adapted to enter slots 28 in the lower edge of a shackle unit for engagement therein by suitable bomb-engagement means generally designated 30. The bomb has forward and rearward air wheels 31 similar in construction to rotary propellers, the rearward air wheel being inside a tail assembly 32 of guide vanes. The bomb is provided with an arming means in the form of a wire 33 normally having its opposite ends blocking rotation of the air wheels 31, the wire having a central loop or arming ring 35 adapted to extend into a slot 36 in a shackle unit and to be engaged therein by an arming member 37. Whether or not a bomb released by a shackle unit is armed or unarmed depends upon whether or not the arming member 37 retains the arming ring 35 and thereby separates the wire 33 from the bomb to permit the air wheels 31 to rotate as the bomb drops through the air. If the wire 33 remains on the falling bomb in the position shown in Fig. 3, the bomb will be in unarmed state and will not explode.

Figure 2:
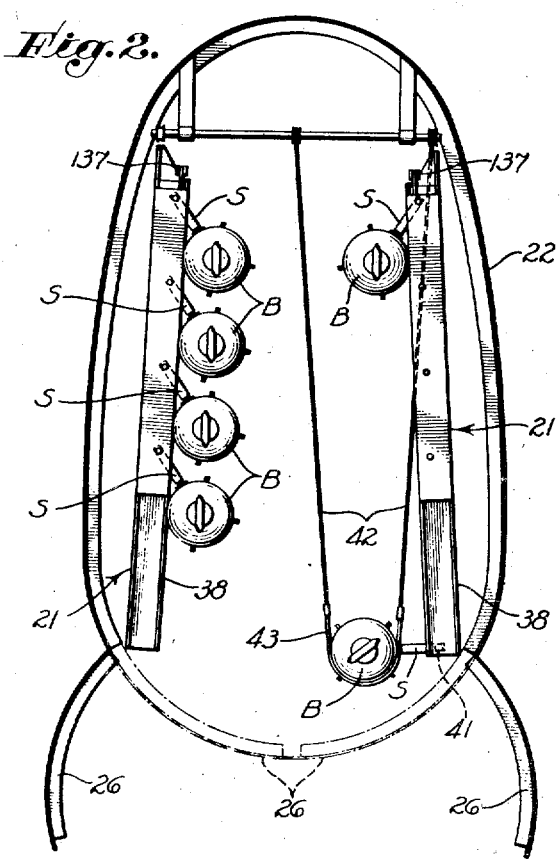
Fig. 2 is a transverse section through the aircraft showing in elevation the apparatus in the course of the loading procedure.
Figure 9:
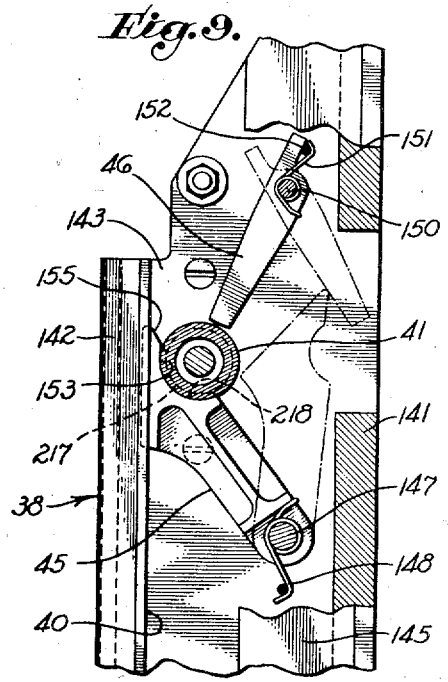
Fig. 9 is a fragmentary section taken as indicated by the line 9—9 of Fig. 4.

As shown in Fig. 2, the frame 21 in the bomb bay includes on each side a pair of parallel frame members or rails 38 and each of the rails provides longitudinal channels 40 shown in section in Fig. 7 and again in elevation in Fig. 9. Each of the shackle units S has a pair of projections in the form of tubular trunnions 41 that are dimensioned to slide in the channels 40. Preparatory to loading a bomb a shackle unit separated from the frame 21 is moved aggressively against the bomb to cause the bomb loops 27 to aggressively enter the slots 28 and thereby cause the engagement means 30 in the shackle unit to automatically engage the bomb. In the preferred loading procedure two separate hoist means represented by two separate hoist cables 42 (Fig. 2) are attached to opposite ends of a sling 43 in which the bomb is cradled for elevation to a shackle station. The two hoist cables 42 are then moved relative to each other as required to rotate the bomb to a position such as shown in Fig. 2 to permit the trunnions 41 of the shackle unit to be guided into the lower ends of the channels 40 on one side of the frame 21. A loading crew of only two men is required, one to manipulate the hoist means and the other to guide the bomb and direct the shackle into the channels 40 at the bottom of the rails.

At each shackle station along a frame channel 40 is mounted suitable means for engaging the shackle, which means, as best shown in Fig. 9 may comprise the combination of a pivoted support arm 45 and a pivoted locking arm 46. The arrangement is such that both arms 45 and 46 at a shackle station automatically retract to permit upward movement of a shackle trunnion through the shackle station, but become effective automatically to engage and lock a shackle trunnion when the trunnion is moved downward into the shackle station. In the loading procedure each shackle unit in turn is guided up the pair of channels to a level above a desired shackle station and then lowered into final locked position at the station.

Each of the shackle units, as shown in Fig. 4, houses mechanical means including a slide rod generally designated 47 that is mechanically responsive to the previously mentioned control linkage 20 for the release of bombs. The slide rod 47 extends into one of the trunnions 41 and when the shackle unit is mounted on the frame 21 at a shackle station, the end of the slide rod 47 is opposite an operating member in the form of a plunger 48 on the frame 21, the operating plunger 48 being operatively connected to the control linkage 20.

Each shackle unit also houses electrically-actuated means including a solenoid 49 that may be energized by a control circuit likewise to release bombs. For electrically connecting the shackle unit to a control circuit in the airplane, two complementary fittings are provided, one fitting 50 fixedly mounted in the other shackle trunnion 41 and a second fitting 51 mounted on a plunger 52 at the shackle station. The plunger 52 is surrounded by a suitable spring 53 that urges the plunger toward the shackle trunnion. The plunger 52 carries a transverse bar 55 adapted for engagement by a pivoted latch lever 56 to hold the fitting or electrical connecting means 51 in cocked or ineffective position as shown in Fig. 4. The bar 55 has a slot 57 in its upper end through which the latch lever 56 extends, the latch lever being adapted to releasably engage the lower edge of the slot.

When the electrical connecting means or fitting 51 is released from its ineffective cocked position, the spring 53 causes longitudinal movement of the plunger. If at such time a shackle unit is mounted at the shackle station, the released electrical connecting means 51 will stop at an effective position shown in Figs. 5, 6, and 8 in engagement with the fitting 50, thereby connecting the solenoid 49 with the control circuit on the aircraft. In the absence of a shackle unit at the shackle station the released plunger will continue to a third or blocking position shown at 58 in Fig. 3, at which blocking position the electrical connecting means 51 extends into the channel 40 to bar any passage of a shackle trunnion through the shackle station. It is apparent that this arrangement forces a member of the loading crew to cock an electrical connecting means 51 prior to any movement of a shackle unit into or through the corresponding shackle station, and if all of the shackle stations are utilized in a loading procedure, all of the electrical connecting means 51 are necessarily cocked in the course of the procedure. Since the upper shackle stations are loaded first and since each upper bomb must pass through all of the stations below, all of the electrical connecting means 51 are cocked as soon as the two uppermost bombs on opposite sides of the frame are mounted for flight.

On each side of the frame 21 is a release rod 60 interlocked with the control linkage 20 to release automatically all the cocked electrical connecting means 51 whenever the doors 26 of the bomb bay are closed at the end of a loading procedure. The human element, then, does not enter into the question of whether or not all shackle units in the bomb bay are electrically connected to the control circuit.

Whenever an electrical connecting means 51 is released in the absence of a shackle unit at a shackle station, the resultant movement of the electrical connecting means to the third or blocking position shown at 58 in Fig. 3 causes the transverse bar 55 to press against and operate a skip switch 61, the skip switch being moved from a first position to a second position to cause the control circuit to be connected to the next shackle station in the predetermined sequence of stations. Inside each shackle unit is a second skip switch 63 that is moved from a first position to a second position whenever the solenoid 49 is deenergized and at the same time the bomb-engagement means 30 of the shackle unit is in released position, the second skip switch likewise causing the control circuit to be connected to the next shackle station in the sequence. In other words, when a bomb is installed at a shackle station, the second skip switch 63 in the shackle unit is made effective to switch the control circuit to the next station only when the solenoid in the shackle unit is energized to release a bomb and then is deenergized after the bomb is released. It is apparent that the inclusion of skip switches 61 and 63 in the control circuit causes the control circuit to be adjusted automatically to the number and distribution of bombs in the bomb bay when the airplane takes off. In other words, whatever shackle stations are loaded with bombs are made automatically responsive to the control circuit in sequence. An indicator or signal switch 64 in each shackle unit controls a corresponding indicator light to indicate to the bombardier that the shackle station is loaded, the switch being responsive to the bomb-engagement means 30.

The arming member 37 as shown in Fig. 4 normally only yieldingly engages an arming ring 35 so that the arming ring may easily escape if the bomb is released. The slide rod 47 controls an arming lever 65 and is movable to three positions. Whenever the control linkage 20 is in either its first or second position, i. e., in its normal position or its door-opening position, the slide rod 47 is in the normal position shown in Fig. 4, and at such time the slide rod blocks electrical or accidental release by the bomb-engagement means 30 and also holds the arming lever 65 at an ineffective position with respect to the arming member 37. If a bomb were to become released under these conditions by structural failure, the arming ring 35 on the bomb would readily escape from the shackle unit and the released bomb would not be in a condition to explode. In the second or firing position of the slide rod 47 shown in Fig. 5, the bomb-engagement means 30 is free to release a bomb in response to energization of the control circuit on the airplane. At such time the arming lever 65 blocks release movement of the arming member 37 so that the arming ring 35 of the bomb is retained in a positive manner when the bomb is released, the retention of the arming ring causing the released bomb to be in an armed state to explode. In movement of the slide rod 47 to the third or emergency position shown in Fig. 6, which movement occurs in response to shifting of the control linkage toward its emergency position, the slide rod causes the bomb-engagement means 30 to release the bomb in an emergency when explosion of the released bomb is not desired. It will be noted in Fig. 6 that the arming lever 65 is swung clear of the arming member 37 thereby to permit the arming member to release the arming ring 35 readily. The various operating plungers 48 that control the various slide rods 47 in the shackle units are in turn controlled by a cam bar 66 that causes the bombs to be dropped successively in the predetermined sequence as the control linkage 20 progresses beyond the previously mentioned firing position of the control linkage to the final emergency position.

The forward control linkage

The portion of the control system forward of the bomb bay may be constructed as shown by way of example in Figs. 1, 12, and 13.

The previously mentioned bombardier's lever 23 extends through a slot 67 in a small housing 68 and is pivotally mounted on a suitable screw 70. Associated with the bombardier's lever is a curved rack 71 in the housing 68, the curved rack being mounted on a pair of spaced bolts 72 and being formed with a curved slot 73 having various recesses corresponding to various positions of the bombardier's lever. One recess (not shown) is engaged by the bombardier's lever in the position of the lever shown in full lines of Fig. 12, which position corresponds to the normal position of the control linkage 20 with the doors 26 of the bomb bay closed. A second recess indicated at 75 in Fig. 12 corresponds to the position of the control linkage 20 at which the doors of the bomb bay are opened, but the various shackle units are locked against electrical release of bombs. When the bombardier's lever is moved from engagement with the recess 75 to engagement with a third recess 76 corresponding to the firing position of the control linkage 20, the shackle units are unlocked to permit release of the bombs in response to energization of the control circuit. When the bombardier's lever 23 is advanced beyond the third recess 76 toward a final recess 77, it passes through a range of positions in which the various shackle units are mechanically operated in succession to release the bombs.

The bombardier's lever 23 comprises two parts adapted for relative longitudinal movement, the two parts being an inner tubular member 80 and an outer tubular member 81. The inner tubular member 80 is seated in a tubular base member 82 and fixedly retained therein by a transverse bolt 83 (Fig. 12). Both the inner and the outer tubular members form a pair of diametrically opposite slots 84 surrounding the curved rack 71 and the inner tubular member has a second pair of diametrically opposite slots 85 to accommodate a transverse locking pin 86 that cooperates with the rack. The locking pin 86 is carried by the outer tubular member 81 and extends through the curved slot 73 of the rack 71 to retractably seat in the various rack recesses. The outer tubular member 81 slidingly embraces the inner tubular member 80 and is formed with a handle portion 87. Normally, the locking pin 86 is in one of the rack recesses and at such time the outer tubular member 81 is slightly retracted from the outer end of the inner tubular member.

To shift the lever from one position to another the bombardier grasps the handle portion 87 for longitudinal movement to unseat the locking pin 86 and to facilitate such longitudinal movement may place his thumb on the protruding end portion 88 of the inner tubular member 80.

Secured within the housing 68 by the previously mentioned bolts 72 is a fixed plate 90 having a downwardly inclined extension 91. The transverse locking pin 86 is connected by a link 92 to an angular arm 93 that is mounted on the extension 91 by a suitable pivot pin 95. The angular arm 93, which comprises a pair of spaced parallel bars, carries at its outer end a small pivoted block 96. A suitable spring 97 extends in tension between the pivoted block and the inclined extension 91. The function of this spring is to urge the angular arm 93 downward continuously and thereby through the medium of the link 92 continuously urge the locking pin 86 in a direction to favor engagement with one of the recesses in the curved rack 71.

A rearward extension 100 of the tubular base member 82 is pivotally connected to a rearwardly extending operating rod 101, which rod may be adjustable in length as indicated in the drawings. The operating rod 101 controls a rocker shaft 102 by acting on a rocker arm 103 and thereby controls a second rocker arm 105 on the shaft that is connected in turn to a rearwardly extending operating rod 106.

The pilot's control lever 25 is of the same general construction as the above described bombardier's lever 23. Thus, an inner tubular member 107 is secured to a base portion 108 by a transverse bolt 110. The base portion 108 is mounted on a suitable pivot 111 and has a forward extension 112 connected to the previously mentioned operating rod 106 and has a rearward extension 113 connected to a rearwardly extending operating rod 115. In the manner previously described, the inner tubular member 107 of the pilot's lever has diametrical slots (not shown) to clear a guide plate 116 that has a curved slot 117. The guide plate 116 corresponds to the curved rack 71 but unlike the curved rack lacks any locking recesses. The inner tubular member 107 of the pilot's lever also has slots (not shown) to accommodate a transverse pin 118 that is carried by an outer tubular member 119. The outer tubular member 119, which has a handle portion 120 and has a slot (not shown) to clear the guide plate 116 slidingly embraces the inner tubular member 107 and may be moved longitudinally thereon to lift the transverse pin 118. A release cable 121 connected to the transverse pin 118 by a small stirrup 122 passes around a guide pulley 123 near the pivot 111, passes around two additional guide pulleys 125, and at the bombardier's station passes around a guide pulley 126 in the housing 68 to terminate at the previously mentioned pivoted block 96 on the end of the angular arm 93.

By virtue of the above described arrangement, the pilot's lever 25 is interlocked with the bombardier's lever 23 and automatically follows movements of the bombardier's lever. Longitudinally outward movement of the handle portion 120 of the pilot's lever, acting through the release cable 121, causes corresponding outward movement of the handle portion 87 of the bombardier's lever and thereby unseats the locking pin 86 at the bombardier's station to permit the pilot to shift the control linkage 21 by swinging the pilot's lever.

In the particular arrangement shown in Fig. 1 the operating rod 115 is connected to the operating arm 127 of a control valve 128 in a hydraulic system (not shown) for operating the doors 26 of the bomb bay. Extending rearward from the operating arm 127 of the control valve is an operating rod 129 that controls a rocker arm 130 on a rocker shaft 131. The rocker shaft 131 has a second rocker arm 132 that is connected by an operating rod 133 to a rocker arm 134 on an upper rocker shaft 135, and the upper rocker shaft carries two additional rocker arms 136 from which a corresponding pair of operating rods 137 extends over opposite sides of the frame 21 in the bomb bay.

Mechanism on the bomb bay frame

As shown in Fig. 7, each of the rails 38 in the frame 21 of the preferred form of the invention is an extruded beam having an outer side wall 141, an inner side wall 142, an interconnecting web 143 and a secondary web 145 spaced from the primary web, the secondary web defining with the inner side wall 142 the previously mentioned channel 40. A sheet metal housing 146 is connected at its longitudinal edges to the side walls of each rail 38 to cooperate with the rail in enclosing various movable parts that are mounted on the rails.

As best shown in Fig. 9 the previously mentioned support arm 45 at each of the shackle stations on a rail 38 is mounted on a pivot 147 between the two webs of the rail, the pivot being to one side of the rail channel 40 to permit the support arm to swing clear of the channel. A suitable spring 148 continuously urges the support arm 45 into the effective position shown in full lines in Fig. 9. The locking arm 46 that is associated with the support arm 45 at each shackle station is mounted on a pivot 150 that is likewise located to one side of the rail channel to permit the locking member to swing clear of the channel. Normally the locking arm 46 is in the effective position shown in full lines in Fig. 9, the locking arm being urged clockwise by a spring 151 against a stop pin 152. When a trunnion 41 of a shackle unit is in normal position at the shackle station, it rests in a curved seat 153 formed in the support arm 45 and at such time the associated locking arm 46 overhangs the trunnion to prevent accidental dislodgment of the trunnion. If a shackle station is not occupied, the trunnion of a shackle unit moving upward into the shackle station will force the support arm to the dotted position of Fig. 9, and the toe 155 of the support arm will strike the locking arm 46 and force the locking arm clear as indicated in Fig. 9. After the trunnion of the shackle unit is moved high enough to permit the support arm to swing back to normal position, the trunnion may be lowered into the seat 153 whereupon the locking arm returns automatically to its effective position. The locking arm 46 at one end of a mounted shackle unit may be manually swung out of the way to free one of the shackle trunnions which may then be raised to tilt the shackle unit out of engagement with the two rails without the necessity of moving the shackle unit down the rails to the entrance ends of the rail channels.

Each of the rearmost operating rods 137 of the control linkage 20 is operatively associated with one of the pairs of cooperating rails 38 on a side of the bomb bay. As shown in Fig. 5, each of the operating rods 137 controls a rearward rocker arm 156 and a forward rocker arm 157 at the top of the pair of side rails 38, the two arms being interconnected by a rod 158. The rearward rocker arm 156 is mounted on one end of a shaft 160 in a bearing 161, and the other end of the shaft carries a rocker arm 162 that actuates the previously mentioned cam bar 66 through the medium of a suitable link 163, the link being connected to a stud 164 (Fig. 7) on the cam bar.

The cam bar 66, which is T-shaped in cross section, slidingly extends through brackets 165 that are mounted on the rear rail at each of the shackle stations. Each of the brackets carries a roller 166 (Fig. 4) on a fixed pivot 167 for rotary contact with the rear of the cam bar. The previously mentioned operating plunger 48 at each of the shackle stations for actuating a slide rod 47 in a shackle unit is slidingly mounted in a block 168 at the base of the corresponding cam bracket 165, and carries at its outer end a roller 170, the roller being mounted on a suitable pin 171 that slidingly extends through guide slots 172 in the arms of the bracket. Suitable means such as a spring 173 (Fig. 6) is provided to continuously urge each of the operating plungers 48 outward against the cam bar 66.

In the region of each shackle station the forward or cam edge of the cam bar 66 forms a dwell 175 that corresponds to the movement of the control linkage 20 between the normal position of the control linkage with the bomb bay doors closed and the position of the control linkage at the end of the opening movements of the door. Throughout this range of movement on the part of the control linkage no mechanical forces are transmitted to the shackle units by the various operating plungers 48. The dwells 175 are of uniform position and dimension at the various shackle stations and each leads to a rise 177 on the cam bar that causes the operating plunger 48 to move inward sufficiently to cause the slide rod 47 in the associated shackle unit to move from its normal position shown in Fig. 4 to its second or firing position shown in Fig. 5. All of the various slide rods 47 in the shackle units are moved simultaneously in this manner whenever the control linkage 20 is moved beyond the door opening position of the control linkage represented by the recess 75 in Fig. 12 to the firing position of the control linkage represented by the recess 76 in Fig. 12.

Adjacent the rise 177 the cam bar 66 has at each shackle station a dwell 178 that represents movement of the control linkage into the range of emergency positions of the control linkage. The dwells 178 at the various shackle stations vary in length and each terminates in a final rise 180 that causes the associated operating plunger 48 to move the slide rod 47 of the corresponding shackle unit from the firing position of the slide rod shown in Fig. 5 to the third or emergency position of the slide rod shown in Fig. 6. Each final rise 180 is followed by a final dwell 181. Since there is a cam bar 66 on each side of the bomb bay and since it is required that the bombs be released in an alternate manner with respect to the two sides of the bomb bay, the sequence being upward, the rise portions 180 on the two cam bars are arranged in staggered relation to carry out the predetermined sequence. Fig. 14 indicates the preferred sequence.

The forward rocker arm 157 is carried by a bracket 182 on a forward rail 38. The bracket 182 as best shown in Fig. 8 is bored to provide a cylinder 183 for an inclined plunger 185. The plunger 185 is in the path of the rocker arm 157 and is continuously urged toward the rocker arm by a concealed spring 186 acting against a head 187 on the end of the plunger, the upward movement of the plunger being limited by a flange 188 on the lower protruding end of the plunger. Normally the inclined plunger 185 is in the position shown in Fig. 5, and the rocker arm 157 does not affect the inclined plunger unless the control linkage 20 is moved into its door-closing position. Whenever the bombardier or pilot operates the control linkage 20 to close the bomb bay doors, the rocker arm 157 swings against the protruding head 187 of the inclined plunger 185 and thereby shifts the plunger longitudinally downward against a lever 190 at the uppermost shackle station. The lever 190 is mounted on a pivot 191 adjacent the previously mentioned latch lever 56 on the same pivot. When the inclined plunger 185 rocks the lever 190, a laterally extending pin 192 on the lever 190 moves against an arm of the latch lever 56 to trip the latch lever and thereby releases the corresponding plunger 52 carrying the corresponding electrical fitting 51.

The outer arm of the lever 190 is pivotally connected to the previously mentioned release rod 60 that extends downwardly to the various shackle stations below. As shown in Fig. 3 the release rod 60 is connected at each shackle station to a lever 190 which is adapted to trip the associated latch lever 56 at the shackle station. Each latch lever 56 is urged toward its latching position by a suitable spring 193 (Fig. 8). It will be noted that the described arrangement permits each of the latch levers 56 to be tripped independently of movement on the part of the associated lever 190, and it will be further noted that each latch lever 56 extends through a slot 195 in the sheet metal housing 146 so that the latch levers may be individually tripped manually when desired.

As best shown in Fig. 8, each of the plungers 52 that carries the electrical fitting 51 at a shackle station is of hollow construction and has an external handle 196 on a stem 197 that extends through the sheet metal housing 146. Each of the plungers 52 is slidingly mounted in a cylindrical body 198 on the rail 38. The previously mentioned spring 53 that urges the plunger inwardly is enclosed in the cylindrical body 198. The electrical fitting 51 that is carried by the plunger extends through a circular aperture 200 in the rail 38 and is provided with a radial flange 201 that serves two purposes, first, to receive pressure from the previously mentioned spring 53 for urging the plunger inwardly, and, second, to abut the rail around the aperture 200 to limit the inward movement of the plunger at the previously mentioned third position of the plunger. When the plunger is in its third position, the portion of the transverse bar 55 extending downwardly from the plunger depresses an operating plunger 202 of the previously mentioned skip switch 61. The switch 61, which is of a type known to the art as a "micro" switch, is normally in its first position and is moved to its second position whenever the operating plunger 202 is moved inward.

As indicated in Fig. 8, the fitting 51 encloses three insulated contacts in concentric disposition to cooperate with three complementary insulated contacts in the complementary fitting 50. Thus, an inner contact in the form of a pin 205 is adapted to fit in a bore 206 in a complementary contact 207 in the fitting 50, an intermediate tubular contact 208 is adapted to telescope into the end of a complementary tubular contact 210 in the fitting 50, and an outer tubular contact 211 is adapted to telescope into a complementary tubular contact 212 in the fitting 50. When the two fittings 50 and 51 are in mutual engagement they electrically connect three wires in the plunger 52 with three corresponding wires in the shackle unit as clearly shown in Fig. 8.

*Detailed construction of a shackle unit*

Each of the shackle units S includes two separable complementary casing sections 215 to form a suitable housing for the shackle mechanism, the two casing sections being rectangular in general configuration and having matched marginal flanges 216 to serve as top, bottom, and end walls. Each of the previously mentioned trunnions 41 is a cylindrical member with a peripheral groove 217 (Fig. 8) for engagement by a complementary curved lip 218 on one of the previously mentioned support arms 45 on the frame 21. Each of the tubular trunnion members is mounted in a bore 220 provided by a block 221, the block 221 being in turn mounted on one of the casing sections 215 by a suitable screw 222.

The previously mentioned bomb-engagement means 30 incorporated in each of the shackle units includes two rotary hooks 223 associated with each of the engagement slots 28 of the shackle units. The two rotary hooks 223 are mounted on pivots 225 and have operating arms 226 that are connected by suitable pins 227 to the opposite ends of a longitudinal member generally designated 228, the longitudinal member serving to interconnect the two rotary hooks for movement in unison. Adjacent each of the engagement slots 28 the shackle unit is reinforced by a pair of complementary blocks 230, the blocks being on opposite faces of the rotary hooks 223 and being cut away to provide working clearance for the rotary hooks. Each of the rotary hooks 223 has an engagement recess or mouth 231 which is open, being on opposite faces of the rotary hooks 223 and to the exterior of the shackle unit, when the engagement mechanism is in release position, as shown in Fig. 6. When the engagement mechanism is in its engagement position to support a bomb, the rotary hooks are turned to the position shown in Fig. 4.

As shown in Figs. 4, 8, and 11, the longitudinal member 228 interconnecting the two rotary hooks 223 may comprise a pair of spaced parallel straps 232 reinforced at each end by shorter straps 233. At one end the two straps 232 are interconnected by rivets 235 and 236, each of which is surrounded by a suitable spacer sleeve 237. A suitable coiled spring 238 acting in tension between the rivet 235 and a fixed stud 240 continuously urges the longitudinal member 228 to the right as viewed in the drawings, thereby continuously urging the engagement mechanism toward its release position.

The previously mentioned indicator switch 64 is provided with a flexible arm 241 that lies in the path of movement of the rivet 236. When the engagement mechanism is in its engagement position as shown in Fig. 4, the rivet 236 is spaced away from the flexible arm 241 and the indicator switch 64 is in its first position. In the release position of the engagement mechanism the rivet 236 presses against the flexible arm 241 as shown in Fig. 6 and thereby depresses a small plunger 242 to hold the indicator switch 64 in its second position.

At the other end of the longitudinal member 228 the two straps 232 are interconnected by a pair of rivets 243 that extend through a spacer block 245 and the spacer block is formed with an upwardly extending engagement shoulder 246. Above the longitudinal member 228 is a first or primary sear 247 mounted on a pivot 248, the sear having an engagement shoulder 250 to cooperate with the engagement shoulder 246 and having a downwardly extending toe 251. If the longitudinal member 228 is moved from its release position through its engagement position to a third limit position (not shown in the drawings), the longitudinal member or some element movable therewith strikes the toe 251 to rotate the sear 247 into the cocked position of the sear shown in Fig. 4 to block the return movement of the longitudinal member from the engagement position shown in Fig. 4. In my preferred construction the toe 251 extends between the planes defined by the two straps 232 and is acted upon by the curved end 252 (Fig. 8) of the operating arm 226 that extends upward from one of the rotary hooks 223.

Mounted in the swinging end of the first sear 247 is a pin 253 that is connected by a pair of parallel links 255 with a second pin 256 in the end of an angular cocking lever 257. The cocking lever 257 which is mounted on a pivot 258 is formed with a small finger 260 that extends downward to the exterior of the shackle unit for manual manipulation. At the cocked position of the cocking lever best shown in Fig. 8 an engagement shoulder 261 on the cocking lever is abutted by a complementary engagement shoulder 262 of a second sear generally designated 263. Preferably a suitable spring 265 wrapped around the pivot 258 and anchored to a stud 266 continuously urges the cocking lever 257 toward its release position shown in Fig. 6.

The described arrangement makes it possible to use either one of two procedures to move the bomb-engagement mechanism from the release position shown in Fig. 6 to the engagement position shown in Fig. 4. In one procedure, the shackle unit, which has been taken from the bomb bay frame 21, is moved vigorously into engagement with the support loops 27 of a bomb. The support loops enter the engagement recesses 231 of the rotary hooks 223 and vigorously force the rotary hooks counter-clockwise. The leftward movement of the longitudinal member 228 past the engagement position of the longitudinal member acting on the toe 251 rotates the first sear 247 into cocked position. In the other procedure the shackle unit is pressed against the support loops 27 of the bomb less vigorously to force the longitudinal member 228 to its engagement position without acting on the toe 251, and while the longitudinal member is in the engagement position the operator manipulates the finger 260 to rotate the cocking lever 257 counter-clockwise against the opposition of the spring 265, the counter-clockwise movement of the cocking lever being translated into clockwise rotation of the first sear 247 through the medium of the interconnecting links 255.

As best shown in Fig. 8, the second sear 263, which is mounted on a pivot 267, has an operating arm 268, a kick arm 270, and an engagement arm 271. The engagement arm 271 of the second sear in addition to forming the previously mentioned engagement shoulder 262 carries a lateral pin 272. The previously mentioned solenoid 49 in the shackle unit has a movable core (not shown) from which extends a plunger 273 to actuate an operating rod 274. As best shown in Fig. 8, the solenoid plunger 273 is formed with a clevis 275 to enter a clevis 276 on the inner end of the operating rod 274 and connection between the plunger and operating rod is effected by a cross pin 277. The cross pin 277 not only extends through the plunger and operating rod but also through the operating arm 268 of the second sear 263. The outer end of the operating rod 274 is formed as a clevis 278 that is connected by a pin 279 to a bell-crank 280. The bell-crank is in the form of a triangular plate mounted on a pivot 281 and is positioned to rotate against an operating plunger 282 for controlling the skip switch 63.

Yielding means to urge the second sear 263 clockwise into engagement with the cocking lever 257 may be in the form of a suitable helical spring 283 embracing the solenoid plunger 273 between the solenoid 49 and the clevis 275. Counter-clockwise rotation of the second sear 263 from the engagement position shown in Fig. 8 not only results in release of the cocking lever 257, but also hastens the release movement of the engagement mechanism in a positive manner since the kick arm 270 of the second sear swings against the cocking lever. Since the cocking lever 257 is connected with the first sear 247 through the links 255, the cocking lever throws the first sear upward in response to the blow from the kick arm 270. The cocking lever 257, the links 255 and the first sear 247 in effect constitute a toggle linkage designed to favor rapid operation. The combined effect of the kick arm 270 and the cocking lever spring 265 is to minimize inertia lag and to cause extremely rapid releasing action in response to energization of the solenoid 49. Rapidity of the releasing action is further favored by the fact that the engagement shoulder 246 on the longitudinal member 228 and the complementary engagement shoulder 250 on the first sear 247 have inclined contact faces as best indicated in Fig. 8, the inclination being in a direction to favor the release action. By virtue of the particular design of the rotary hooks 223 shown in the drawings, the weight of the engaged bomb creates a releasing moment on the engagement mechanism of exceptionally high magnitude, favoring exceedingly rapid releasing action on the part of the two rotary hooks as soon as the longitudinal member 228 is released by the first sear 247.

The operating rod 274 connected with the solenoid 49 has three positions, namely, a retracted position when the solenoid is energized, an intermediate position when the solenoid is deenergized while the second sear 263 is cocked, and a third or limit position to which it is urged by the spring 283 when the solenoid is deenergized while the second sear is uncocked. Whenever a bomb is released by the shackle unit the spring 283 on the solenoid plunger automatically moves the operating rod 274 to its third position and thereby forces the bell-crank 280 against the operating plunger 282 to move the skip switch 63 to open position.

The previously mentioned slide rod 47 in the shackle unit has a cylindrical portion 285 that is guided by a bearing 286 and by a bushing 287 in the associated trunnion 41. Embracing the cylindrical portion 285 is a suitable spring 288 that acts between the bearing 286 and a radial flange 290 to urge the slide rod outward. Unitary with the cylindrical portion 285 of the slide rod is a blade portion 291 that is formed with a longitudinal slot 292, a locking shoulder 293, and an inclined cam shoulder 295 at the opening to a recess 296. The longitudinal slot 292 surrounds a fixed stop pin 297 that limits the outward movement of the slide rod at the release position shown in Fig. 4, the outer end of the slide rod being substantially flush with the outer end of the associated trunnion 41.

The slide rod 47 is in its first position shown in Fig. 4 whenever the control linkage 20 is in either the normal closed-door position or in the open-door position represented by the recess 75 in Fig. 12. At such time the locking shoulder 293 of the blade portion of the slide rod is in the path of movement of the lateral pin 272 and consequently prevents rotation of the second sear 263 by accidental energization of the solenoid 49. When the bombardier's handle is shifted forward from the recess 75 to the recess 76 representing the firing disposition of the control linkage 20, the plunger 48 at the shackle station moves the slide rod inwardly to a position at which the recess 296 in the blade portion of the slide rod is opposite the lateral pin 272 and at such time the recess 296 provides clearance for counter-clockwise rotation of the second sear 263 in response to energization of the solenoid. When the bombardier's lever is shifted from the recess 76 to the final recess 77, each of the slide rods 47 in the various shackle units in its turn is shifted sufficiently to cause the inclined cam shoulder 295 of the slide rod to engage and lift the lateral pin 272, thereby to rotate the second sear 263 out of engagement with the cocking lever 251, whereupon the previously described releasing action of the shackle mechanism is carried out automatically with extreme rapidity.

For operation of the arming lever 65, the blade portion of the slide rod 47 is provided with a stud 298 that engages a suitable slot 300 on the end of the arming lever. The previously mentioned arming member 37 below the arming lever 65 may be in the form of a small plate mounted on a pivot 301, the plate having an engagement finger 302. A suitable spring 303 wound around the pivot 301 and anchored to a stud 305 yieldingly urges the arming member 37 clockwise to a normal position at which the engagement finger 302 extends across the arming slot 36. A portion 306 of the arming member 37 normally protrudes downward from the shackle unit for manual manipulation by the loading crew whenever it is desirable to retract the engagement finger 302 to admit an arming ring 35 of a bomb. It will be noted that in the normal position of the arming member 37, the engagement finger 302 presents an inclined surface in contact with the arming ring 35 so that downward pressure by the arming ring tends by a camming action to rotate the arming element counterclockwise to release the ring. When the slide rod 47 is in the firing position shown in Fig. 5, the arming lever 65 is in a position to block releasing rotation of the arming member 37, but at the other two positions of the slide rod shown in Figs. 4 and 6 the arming member 37 is free to rotate to its release position in response to any undue downward pressure by an arming ring 35 in the arming slot. The spring 303 is strong enough to hold an arming ring 35 effectively under normal circumstances but is light enough to insure release of an arming ring if a bomb is released by the shackle unit while the slide rod 47 is out of the firing position.

Electrical arrangement

The electrical system incorporated in the invention may be designed in the manner suggested by the wiring diagram in Fig. 14, the wiring diagram representing an airplane in flight with bombs at all of the eight shackle stations. Each shackle unit represented by the diagram has three wires connected with an electrical fitting 50 (not shown in the diagram). One of the three wires in each shackle unit is a wire 310 that leads to the indicating switch 64 in the shackle unit, the indicating switch being grounded. A second wire 311 in each shackle unit leads to the switch arm of the previously mentioned skip switch 63 in the shackle unit. At what has been termed the first position of the skip switch 63, the skip switch is disposed to transmit current to the shackle unit solenoid 49, the solenoid being grounded to complete the circuit. At what has been termed the second position of the skip switch 63, the switch arm of the skip switch is disposed to transmit current to a third wire 312 in the shackle unit.

The wiring diagram shows a grounded battery 313 that is adapted to energize an indicating circuit represented by a wire 315 and a firing circuit represented by a wire 316.

In the indicating circuit the wire 315 which is broken by a master indicating switch 317 is connected to a series of eight indicating lamps 318, each of which represents one of the shackle stations. A wire 320 from each of the lamps 318 connects the lamp with the corresponding shackle station and at the shackle station through the medium of the cooperating electrical fittings 50 and 51 (not shown in the diagram) the wire 320 is connected to the wire 310 in the corresponding shackle unit to complete the lamp circuit. It is apparent that when the master indicating switch 317 is closed, lamps 318 representing the loaded shackle stations will be lighted. Whenever a bomb is released from a shackle station, the indicating switch 63 in the shackle unit is opened in the manner previously described, thereby deenergizing the corresponding lamp. More than one set of indicator lamps 318 may be used to indicate the status of the apparatus at more than one station on the aircraft.

In the firing circuit the wire 316 is broken by a master firing switch 321 and is connected both to a manually operable control switch 322 and to an automatic control switch 323, the two switches being in parallel. The automatic control switch 323 may be an intervalometer adapted to open and close at selected time intervals to release bombs at selected spacing. The manual firing switch 322 is used to release the bombs one at a time at the judgment of the bombardier. The two switches 322 and 323 are connected by a wire 325 to the outside skip switch 61 at shackle station No. 1, and the skip switch 61 is in turn connected by the electrical fittings at the shackle station to the wire 311 and the solenoid 49 in the shackle unit. If the bomb-engagement mechanism in the shackle unit at the shackle station No. 1 is in its release position, the skip switch 63 in the shackle unit will be in its second position to transmit current to the wire 312 in the shackle unit instead of transmitting current to the solenoid 49.

The wire 312 through the cooperating electrical fittings at shackle station No. 1 is connected to a wire 326 that leads to the skip switch 61 at shackle station No. 2 on the opposite side of the apparatus, the skip switch 61 at shackle station No. 2 being in its first position to connect with the wire 311 in the corresponding shackle unit. If the skip switch 61 outside the shackle unit at shackle station No. 1 is in its second position, it connects with the wire 326 instead of connecting with the wire 311 at shackle station No. 1 and thereby cuts out the corresponding shackle unit at shackle station No. 1. To complete the firing circuit the following additional wires having the same function as the wire 326 are shown in Fig. 14: a wire 327 from shackle station No. 2 to the outside skip switch 61 at shackle station No. 3; a wire 328 from shackle station No. 3 to the outside skip switch 61 at shackle station No. 4; a wire 330 from shackle station No. 4 to the outside skip switch 61 at shackle station No. 5; a wire 331 from shackle station No. 5 to the outside skip switch 61 at shackle station No. 6; a wire 332 from shackle station No. 6 to the outside skip switch 61 at shackle station No. 7; and a wire 333 from shackle station No. 7 to the outside skip switch 61 at shackle station No. 8. No return wire from shackle station No. 8 is required.

It is clear that the firing circuit of Fig. 14 is adapted to accommodate itself automatically to the instant number and the instant distribution of bombs carried by the aircraft. If any of the shackle units is omitted, the corresponding outside skip switch 61 at the shackle station automatically operates to cause the circuit to jump to the next station in the sequence. If a shackle unit is inadvertently mounted at a station without a bomb, the bomb-engagement mechanism of the shackle unit will be in release position, thereby causing the corresponding skip switch 63 in the shackle unit to take its second position to cause current to be delivered to the next shackle station instead of to the solenoid in the shackle unit. The bomb load at any instant may be ascertained simply by closing the indicating switch 317 to energize lamps 318.

My disclosure in specific detail of the preferred form of the invention will suggest to those skilled in the art various substitutions and changes that do not depart from my underlying inventive concepts, and I reserve the right to all such variations that lie within the scope of the appended claims.

I claim as my invention:

1. An aircraft apparatus for aerial bombs, comprising: a frame comprising an upwardly extending guide channel with a lower entrance end, there being a series of shackle stations spaced along said channel; a plurality of bomb shackles having projections for sliding engagement with said guide channel, whereby the shackles loaded with bombs may be carried through said stations; engagement means at said shackle stations along said channel to engage said projections for support of said shackles; means pivotally mounting said engagement means and adapting the latter to yield to upward movement of said projections; and means loading said engagement means to return the latter to position to block downward movement of said projections and support the same.

2. An aircraft apparatus for aerial bombs, comprising: a frame comprising an upwardly extending guide means with a lower entrance end; a plurality of bomb shackles having portions for sliding engagement with said guide means; engagement means at spaced shackle stations along said means to engage said portions for support of said shackles; means mounting said engagement means and adapting the latter to yield to upward movement of said portions and to return to block downward movement of said portions; and retractable stops at said shackle stations in the path of said portions when seated on said engagement means to prevent upward movement of said shackle portions when the shackle portions are seated on said engagement means.

3. An apparatus as set forth in claim 2 in which each of said stops is mounted on said guide means in the path of the corresponding engagement means and is thereby retractable in response to yielding movement of the corresponding engagement means when no shackle portion is on the engagement means in the path of the respective stop.

4. An aircraft apparatus for aerial bombs, comprising: a frame providing two spaced parallel upwardly extending guide means having lower entrance ends; a plurality of bomb shackles having portions positioned for sliding engagement with said guide means; means at spaced shackle stations along said means to engage said portions for support of said shackles; bomb supporting and releasing means carried by said shackles; and control means including operating members at said shackle stations cooperative with said releasing means on the shackles for causing said shackles to release bombs in the course of flight while the shackles are retained by said support means.

5. An aircraft apparatus for aerial bombs, comprising: a frame providing two spaced parallel upwardly extending guide means having lower entrance ends; a plurality of shackle units for releasably supporting bombs, each of said shackle units having two portions for sliding engagement respectively with said guide means; means at spaced shackle stations along said means to engage said portions for support of said shackles; releasable bomb engaging means on the shackle unit; electric control means for causing the shackle units to release bombs, said electric control means including conductors at each of said shackle stations for electrical connection with each of said shackle units through one of said portions of the shackle unit; and mechanical control means to cause said shackle units to release bombs, said mechanical control means including an operative member at each of said stations adapted to transmit force mechanically to each of the shackle units through the other of the shackle portions.

6. In an aircraft having a bomb bay normally closed by door means, the combination therewith of apparatus for handling an aerial bomb having a relatively movable arming means, said apparatus including: a first control means movable from a normal position to a firing position; means to open said door means in response to movement of said first control means from said normal position; means to releasably support said bomb; a second control means to release said bomb from said support means; means to prevent release of said bomb while said first control means is in said normal position with said door means closed; means normally effective to yieldingly engage said arming means of the bomb in a manner to permit release of the arming means when the bomb is released by said support means thereby to preclude detonation of the released bomb; and means effective to engage said arming means in a positive manner whenever said first control means is in said firing position.

7. An apparatus for use with an aerial bomb on an aircraft, said apparatus comprising: a support means mounted on the aircraft; a shackle unit adapted for releasable engagement both with said support means and with said bomb; electrical actuating means carried by said shackle unit to release said bomb; an electric control on the aircraft for operating said electrical actuating means; electrical connecting means carried by the aircraft for interconnecting said electric control and said electrical actuating means when said shackle unit is engaged with said support means, said electrical connecting means being movable between an ineffective position and an effective position, said electrical connecting means when at said effective position blocking the path of movement of the shackle unit with respect to said support means, thereby making it necessary to move the electrical connecting means to its ineffective position to permit operative engagement of the shackle unit with the support means; and remotely controlled means to cause movement of said electrical connecting means from its ineffective position to its effective position after the shackle unit is operatively engaged with the support means.

8. An apparatus for use with an aerial bomb on an aircraft, said apparatus comprising: a support means mounted on the aircraft; a shackle unit adapted for releasable engagement both with said support means and with said bomb; electrical actuating means carried by said shackle unit to release said bomb; an electric control on the aircraft for operating said electrical actuating means; electrical connecting means carried by the aircraft for interconnecting said electric control and said electrical actuating means when said shackle unit is engaged with said support means, said electrical connecting means being movable between an ineffective position and an effective position, said electrical connecting means when at its effective position blocking the path of movement and preventing disengagement or engagement of the shackle unit with said support means, thereby making it necessary to move the electrical connecting means to its ineffective position to permit operative engagement of the shackle unit with the support means; yielding means to urge said electrical connecting means from its ineffective position to its effective position; latch means to hold said electrical connecting means at its ineffective position in opposition to said yielding means; and remote control means to release said latch means after the shackle unit is engaged with the support means.

9. In an aircraft having a bomb bay normally closed by door means, the combination therewith of apparatus for an aerial bomb, said apparatus including: a support means mounted on the aircraft; a shackle unit adapted for releasable engagement both with said support means and with said bomb; electrical actuating means carried by said shackle unit to release said bomb; an electric control on the aircraft for operating said electrical actuating means; electrical connecting means carried by the aircraft for interconnecting said electric control and said electrical actuating means when said shackle unit is engaged with said support means, said electrical connecting means being movable between an ineffective position and an effective position, said electrical connecting means at said effective position blocking the path of movement of the shackle unit with respect to said support means, thereby making it necessary to move the electrical connecting means to its ineffective position to permit engagement of the shackle unit with the support means; remote control means to open and close said door means; and means to move said electrical connecting means from its ineffective position to its effective position in response to closing of said door means.

10. An apparatus for use in an aircraft to transport and release bombs, said apparatus including: a support means carried by the aircraft; a plurality of shackle units adapted for releasable engagement with said support means, each shackle unit being adapted for releasable engagement with one of said bombs; electrical actuating means carried by each of said shackle units to release the bomb engaged by the shackle unit; an electrical control on the aircraft for operating said electrical actuating means; a plurality of electrical connecting means carried by the aircraft corresponding to said plurality of shackle units for connecting said electrical control with the electrical actuating means on the shackle units, each of said electrical connecting means being movable between an ineffective and an effective position; and a control means effective to cause all of said electrical connecting means to move to said effective positions after various shackle units are engaged with said support means.

11. An apparatus for use in an aircraft to transport and release bombs, said apparatus including: a support means carried by the aircraft; a plurality of shackle units adapted for releasable engagement with said support means, each shackle unit being adapted for releasable engagement with one of said bombs; electrical actuating means carried by each of said shackle units to release the bomb engaged by the shackle unit; an electrical control on the aircraft for operating said electrical actuating means; a plurality of electrical connecting means carried by the aircraft corresponding to said plurality of shackle units for connecting said electrical control with the electrical actuating means on the shackle units, each of said electrical connecting means being movable between an ineffective position and an effective position, each of said electrical connecting means at its effective position blocking the path of movement of the corresponding shackle unit with respect to said support means; yielding means urging each of said electrical connecting means to said effective position; latch means to hold each of said electrical connecting means at its ineffective position in opposition to said yielding means to clear said path; and control means to release said latch means after said shackle units are operatively engaged with said support means.

12. In an aircraft having a bomb bay normally closed by door means, the combination therewith of apparatus for a plurality of aerial bombs, said apparatus including: a support means carried by the aircraft; a plurality of shackle units adapted for releasable engagement with said support means, each shackle unit being adapted for releasable engagement with one of said bombs; electrical actuating means carried by each of said shackle units to release the bomb engaged by the shackle unit; an electrical control on the aircraft for operating said electrical actuating means; a plurality of electrical connecting means carried by the aircraft corresponding to said plurality of shackle units for connecting said electrical control with the electrical actuating means on the shackle units, each of said electrical connecting means being movable between an ineffective position and an effective position; and a control means effective to cause all of said electrical connecting means to move to said effective positions automatically when said door means is closed after such shackle units are engaged with said support means.

13. In an aircraft having a bomb bay normally closed by door means, the combination therewith of apparatus for a plurality of aerial bombs, said apparatus including: a support means carried by the aircraft; a plurality of shackle units adapted for releasable engagement with said support means, each shackle unit being adapted for releasable engagement with one of said bombs; electrical actuating means carried by each of said shackle units to release the bomb engaged by the shackle unit; an electrical control on the aircraft for operating said electrical actuating means; a plurality of electrical connecting means carried by the aircraft corresponding to said plurality of shackle units for connecting said electrical control with the electrical actuating means on the shackle units, each of said electrical connecting means being movable between an ineffective position and an effective position, each of said electrical connecting means at its effective position having a portion in the path of and blocking engagement of the corresponding shackle unit with said support means; yielding means urging each of said electrical connecting means to its effective position; latch means to hold each of said electrical connecting means at its ineffective position in opposition to said yielding means; and automatic means effective to release all of said latch means when said door means is closed after said plurality of shackle units are engaged with said support means.

14. An apparatus for use with an aerial bomb on an aircraft, said apparatus comprising: a support means mounted on the aircraft; a shackle unit including a casing adapted for releasable attachment to said support means at a shackle station on the support means; engagement means carried by said shackle unit, said engagement means being movable between a release position and an effective position to engage and support said bomb, whereby said shackle unit may be engaged with said bomb outside the aircraft and then with the bomb attached thereto may be moved into the aircraft into engagement with said support means; yielding means to urge said engagement means to its release position; means to latch said engagement means in said effective position in opposition to said yielding means, said casing enclosing said latch means to prevent release of said engagement means while said bomb is attached to said shackle unit apart from said support means; electrical actuating means carried by said shackle unit to release said latch; a firing control on the aircraft adapted to control the energization of said electrical actuating means while the shackle unit is attached to said support means; a remote control means movable from a normal position to a firing position and to an emergency position; means responsive to said remote control means to prevent release of said latch means when said remote control means is in said normal position and to permit release of said latch means when said remote control means is at said firing position; and mechanical means carried by said shackle unit to release said latch means independently of said electrical actuating means, said mechanical means being responsive to movement of said remote control means to said emergency position.

15. In an aircraft having a bomb bay normally closed by door means, the combination therewith of apparatus for transporting and releasing an aerial bomb, said apparatus comprising: a support means mounted on the aircraft; a shackle unit adapted for releasable attachment to said support means at a shackle station on the support means; engagement means carried by said shackle unit, said engagement means being movable between a release position and an effective position to engage and support said bomb, whereby said shackle unit may be engaged with said bomb outside the aircraft and then with the bomb attached thereto may be moved into the aircraft into engagement with said support means; yielding means to urge said engagement means to its release position; means to latch said engagement means in said effective position in opposition to said yielding means; electrical actuating means carried by said shackle unit to release said latch; switch means on the aircraft adapted to control the energization of said electrical actuating means while the shackle unit is attached to said support means; a remote control means movable from a normal position to a firing position; means to open said door means in response to movement of said control means from said normal position to said firing position; and means responsive to said remote control means to prevent release of said latch means when said remote control means is in said normal position and to permit release of said latch means when said remote control means is at said firing position.

16. In an aircraft having a bomb bay normally closed by door means, the combination therewith of apparatus for transporting and releasing an aerial bomb, said apparatus comprising: a support means mounted on the aircraft; a shackle unit adapted for releasable attachment to said support means at a shackle station on the support means; engagement means carried by said shackle unit, said engagement means being movable between a release position and an effective position to engage and support said bomb, whereby said shackle unit may be engaged with said bomb outside the aircraft and then with the bomb attached thereto may be moved into the aircraft into engagement with said support means; yielding means to urge said engagement means to its release position; means to latch said engagement means in said effective position in opposition to said yielding means; electrical actuating means carried by said shackle unit to release said latch; switch means on the aircraft adapted to control the energization of said electrical actuating means while the shackle unit is attached to said support means; a remote control means movable from a normal position to a firing position and to an emergency position; means to open said door means in response to movement of said remote control means away from said normal position; means responsive to said remote control means to prevent release of said latch means when said remote control means is in said normal position and to permit release of said latch means when said remote control means is at said firing position; and mechanical means carried by said shackle unit to release said latch means independently of said electrical actuating means, said mechanical means being responsive to movement of said remote control means to said emergency position.

17. An apparatus for use in an aircraft to transport and release bombs, said apparatus including: a support means carried by the aircraft, said support means having a series of shackle stations for sequential release of the bombs; a plurality of shackle units adapted for releasable engagement with said support means, each shackle unit being adapted for releasable engagement with one of said bombs, whereby said shackle unit may be engaged with said bomb outside the aircraft and then with the bomb attached thereto may be moved into the aircraft into engagement with said support means; electrical actuating means carried by each of said shackle units to cause release of the bomb engaged by the shackle unit; a circuit including conductors to each of said shackle stations for energization of said electrical actuating means; a switch means for controlling said circuit; and skip switches in said circuit at said shackle stations, each of said skip switches having a first position to transmit current to the corresponding shackle unit and having a second position to transmit the current to the next shackle station, each of said skip switches being biased toward its second position and having means movable to said first position in response to engagement of the corresponding shackle with said support means.

18. An apparatus for use in an aircraft to transport and release bombs, said apparatus including: a support means carried by the aircraft, said support means having a series of shackle stations for sequential release of the bombs; a plurality of shackle units; freely actuable means on said support means at each of said stations for freely receiving and releasably supporting the respective shackle unit, each shackle unit being adapted for releasable engagement with one of said bombs; electrical actuating means carried by each of said shackle units to release the bomb engaged by the shackle unit; a control circuit including conductors to each of said shackle stations and conductors in each of said shackle units; and skip switches in said shackle units in said circuit, each of said skip switches having a first position to transmit current to the electrical actuating means in the shackle unit and having a second position to transmit the current away from said actuating means to the next shackle station, each of said skip switches having means movable from said first position to said second position in response to bomb-releaes operation of the shackle unit, whereby release of a bomb by one shackle unit automatically causes the next succeeding shackle unit in the sequence to become responsive to said master switch means.

19. An apparatus for use in an aircraft to transport and release bombs, said apparatus including: a support means carried by the aircraft, said support means having a series of shackle stations for sequential release of the bombs; a plurality of shackle units adapted for releasable engagement with said support means, each shackle unit being adapted for releasable engagement with one of said bombs; electrical actuating means carried by each of said shackle units to release the bomb engaged by the shackle unit; a control circuit including conductors to each of said shackle stations and conductors in each of said shackle units; a first series of skip switches in said circuit at said shackle stations separate from said shackle units, each of said skip switches having a first position to transmit current to the corresponding shackle unit and a second position to transmit the current to the next shackle station in the sequence, each of said skip switches being biased toward its second position and having means movable to said first position in response to engagement of the corresponding shackle unit with said support means; and a second series of skip switches in said circuit in said shackle units, each of said skip switches of the second series having a first position to transmit current to the electrical actuating means in the shackle unit and having a second position to transmit the current to the next shackle station, each of said skip switches of said second series having means movable from said first position to said second position in response to bomb-release operation of the corresponding shackle unit.

20. An apparatus for use in an aircraft to transport and release bombs, said apparatus including: a support means carried by the aircraft, said support means having a series of shackle stations for sequential release of the bombs; a plurality of shackle units adapted to be removably mounted on said support means at said stations, each shackle unit being adapted for releasable engagement with one of said bombs; electrical actuating means carried by each of said shackle units to release the bomb engaged by the shackle unit; a control circuit on the aircraft including conductors to each of said shackle stations for energization of said actuating means; electrical connecting means on the aircraft at each of said shackle stations for connecting said conductors to the electrical actuating means in the corresponding shackle unit when the shackle unit is mounted on said support means, each of said electrical connecting means being movable from an ineffective position to an effective position and beyond the effective position to a third position, each of said shackle units having means adapted when mounted to stop the corresponding electrical connecting means at its effective position; control means to cause movement of all of said electrical connecting means from their ineffective positions toward their third positions; and skip switches included in said control circuit at said shackle stations, each of said skip switches having a first position to transmit current to the corresponding shackle unit and a second position to transmit the current to the next shackle station, each of said skip switches being biased toward its second position and having means movable to said first position in response to movement of the corresponding electrical connecting means at the shackle station from the effective position of the electrical connecting means to the third position of the electrical connecting means, whereby the omission of a shackle unit results in said circuit being established to the succeeding shackle station.

21. An apparatus for use in an aircraft to transport and release bombs, said apparatus including: a support means carried by the aircraft, said support means having a series of shackle stations for sequential release of the bombs; a plurality of shackle units adapted to be removably mounted on said support means, each shackle unit being adapted for releasable engagement with one of said bombs; electrical actuating means carried by each of said shackle units to release the bomb engaged by the shackle unit; a control circuit including conductors to each of said shackle stations and conductors in each of said shackle units from the corresponding shackle stations; electrical connecting means in said circuit on the aircraft at each of said shackle stations for establishing electrical connection with the corresponding shackle unit when the shackle unit is engaged with said support means, each of said electrical connecting means being movable from an ineffective position to an effective position and beyond the effective position to a third position, each of said electrical connecting means at its effective position having means blocking mounting of a shackle unit on said support means, thereby making it necessary to move the electrical connecting means to its ineffective position to permit mounting of the shackle unit; yielding means to urge each of said electrical connecting means from its ineffective position toward its third position; latch means at each of said shackle stations to hold said electrical connecting means at their ineffective positions in opposition to said yielding means; remote control means to release all of said latch means after the aircraft is loaded with bombs; a first series of skip switches included in said circuit at said shackle stations, each of said skip switches having a first position to transmit current to the corresponding shackle unit and a second position to establish the circuit to the next shackle station, each of said skip switches being biased toward its second position and having means movable to said first position in response to movement of the corresponding electrical connecting means at the shackle station from the effective position of the electrical connecting means to the third position of the electrical connecting means, whereby the omission of a shackle unit causes the control circuit to be established to the succeeding shackle station; and a second series of skip switches in said circuit in said shackle units, each of said skip switches of the second series having a first position to transmit current to the electrical actuating means in the shackle unit and having a second position to establish the circuit to the next shackle station, each of said skip switches of said second series having means movable from said first position to said second position in response to bomb-release operation of the corresponding shackle unit.

22. In an aircraft having a bomb bay normally closed by door means, the combination therewith of apparatus for transporting and releasing bombs, said apparatus including: a support means carried by the aircraft, said support means having a series of shackle stations for sequential release of the bombs; a plurality of shackle units adapted to be removably mounted on said support means, each shackle unit being adapted for releasable engagement with one of said bombs; electrical actuating means carried by each of said shackle units to release the bomb engaged by the shackle unit; a control circuit for operating said electrical actuating means, said circuit including conductors to each of said stations; a plurality of electrical connecting means at said stations for connecting said conductors with the electrical actuating means on the shackle units, said electrical connecting means being movable from ineffective positions to effective positions and vice versa; means to cause movement of all of said electrical connecting means from ineffective positions toward effective positions whenever said door means is closed; a series of skip switches in said control circuit at said shackle stations, each of said skip switches having a first position to transmit current to the corresponding shackle unit and a second position to establish the circuit to the next shackle station in sequence; and means effective when said door means is closed to move each of said skip switches to its second position whenever a shackle unit is omitted from the corresponding shackle station.

23. In an aircraft having a bomb bay normally closed by door means, the combination therewith of apparatus for an aerial bomb, said apparatus including: a support means mounted on the aircraft; a shackle unit including a casing adapted for releasable attachment to said support means at a shackle station on the support means; engagement means on said shackle unit movable between an engagement position to engage and support a bomb and a release position, whereby said shackle unit may be engaged with said bomb outside the aircraft and then with the bomb attached thereto may be moved into the aircraft into engagement with said support means; sear means on said shackle unit movable between a release position and a cocked position, the cocked sear blocking movement of said engagement means to the release position of the engagement means; a remote control member on the aircraft movable from a normal position to a position for releasing a bomb; means effective to open said door means in response to movement of said control member away from said normal position; an operating member at said shackle station responsive to operation of said control member; means on said shackle unit responsive to said operating member to prevent movement of said sear means to its release position when said control member is in said normal position with said door means closed; and means on said shackle unit responsive to said operating member to move said sear means to release position when said operating member is moved to its bomb-release position, said casing protecting said last-named means and said sear against release actuation while said casing is detached from said support means.

24. In an aircraft having a bomb bay normally closed by door means, the combination therewith of apparatus for an aerial bomb, said apparatus including: a support means mounted on the aircraft; a shackle unit including a casing adapted for releasable attachment to said support means at a shackle station on the support means; engagement means on said shackle unit movable between an engagement position to engage and support a bomb and a position to release the bomb, whereby said shackle unit may be engaged with said bomb outside the aircraft and then with the bomb attached thereto may be moved into the aircraft into engagement with said support means; sear means on said shackle unit movable between a release position and a cocked position, the cocked sear blocking release movement of said engagement means; electromagnetic means on said shackle unit to move said sear means to its release position; electric control means on the aircraft adapted for detachable connection with said shackle unit for energization of said electromagnetic means; means effective to prevent uncocking of said sear means while said door means is closed; and an emergency control means to uncock said sear means, said emergency control means being operatively interlocked with said door means to prevent emergency release of said sear means while said door means is closed.

25. In an aircraft having a bomb bay normally closed by door means, the combination therewith of apparatus for an aerial bomb, said apparatus including: a support means mounted on the aircraft; a shackle unit including a casing adapted for releasable attachment to said support means at a shackle station on the support means; engagement means on said shackle unit movable between an engagement position to engage and support a bomb and a position to release the bomb, whereby said shackle unit may be engaged with said bomb outside the aircraft and then with the bomb attached thereto may be moved into the aircraft into engagement with said support means; sear means on said shackle unit movable between a release position and a cocked position, the cocked sear blocking release movement of said engagement means; remote control means movable from a normal position to a firing position and to an emergency position; means effective to open said door means in response to movement of said remote control means away from said normal position; electromagnetic means in said shackle unit to move said sear means to its release position; an electric control on the aircraft to energize said electromagnetic means; mechanical means in said shackle unit effective to move said sear means to its release position in response to movement of said remote control means to said emergency position, said casing enclosing said electromagnetic means, sear means, and mechanical means to prevent accidental release of the sear means when said shackle unit is detached from said support means; and means in said shackle unit responsive to said remote control means to prevent release of said sear means while said remote control means is in said normal position and to permit release of the sear means when said remote control means is in said firing position.

26. An aircraft apparatus for a plurality of aerial bombs having relatively movable arming means, said apparatus including: a first control means movable from a normal position to a firing position and through a range of emergency release positions; a plurality of means corresponding to said plurality of bombs to releasably support the bombs; means connecting said first control means with each of said support means and adapted to release the bombs in sequence in response to movement of said first control means through said range of emergency release positions; a second control means to operate said support means to release the bombs when said first control means is in said firing position; and means effective to engage said arming means in an operative manner whenever said first control means is in said firing position.

27. An aircraft apparatus for a plurality of aerial bombs having relatively movable arming means, said apparatus including: a first control means movable from a normal position to a firing position and through a range of emergency release positions; a plurality of means corresponding to said plurality of bombs to releasably support the bombs; means connecting said first control means with each of said support means and adapted to release the bombs in sequence in response to movement of said control means through said range of emergency release positions; a second control means to operate said support means to release the bombs when said first control means is in said firing position; and means under control of said first control means to retain said arming means in a positive manner when said first control means moves to said firing position.

28. In an aircraft having a bomb bay normally closed by door means, the combination therewith of apparatus for handling an aerial bomb having a relatively movable arming means, said apparatus including: a first control means movable between a normal position and a firing position; means to open said door in response to movement of said first control means from said normal position to said firing position; a second control means; means to releasably support said bomb, said support means being adapted to release said bomb in response to operation of said second control means; means to prevent release of the bomb by said second control means when said first control means is in said normal position; means mounted in said bomb bay to engage said arming means in an operative manner when said control means is in said firing position; and means providing for disengagement of said arming means from said engaging means, when said first control means is out of firing position.

29. In an aircraft having a bomb bay normally closed by door means, the combination therewith of apparatus for handling an aerial bomb having a relatively movable arming means, said apparatus including: a first control means movable from a normal position to a firing position; means to open said door means in response to movement of said first control means from said normal position; means to releasably support an operative connection between said bomb; said support means and said first control means to release said bomb; means to prevent release operation of said support means while said first control means is in said normal position with said door means closed; means to engage and retain said arming means whenever said first control means is in said firing position; a second control means to operate said support means to release said bomb while said first control means is in said firing position; and means providing for disengagement of said arming means from said engaging means, when said first control means is out of firing position.

30. In an aircraft having a bomb bay normally closed by door means and having means to releasably support a bomb in said bomb bay, the combination of: a first control means at a first station on the aircraft movable from a normal position to a firing position and to an emergency position, said first control means being operatively connected to said support means to release a bomb; means to open said door means in response to movement of said first control means from said normal position to said firing position or to said emergency release position; a second control means operatively connected to said support means to release a bomb; means to prevent release action by said support means while said door means is closed and said first control means is in said normal position; an alternative control means at a second station operatively connected with said first control means to move therewith, whereby either said first or said alternative control means may be employed to actuate the other to said emergency position; detent means at one of said stations to hold the corresponding control means at the station in said positions selectively; and remote control means at the other of said stations for release of said detent means.

31. An apparatus for use with an aerial bomb on an aircraft, said apparatus comprising: a support means mounted in the aircraft; a shackle unit adapted for releasable engagement with said bomb to support the bomb, said shackle unit having a first portion adapted for releasable engagement with said support means at one point of the support means and a second portion adapted for releasable engagement with the support means at a second point; electrical actuating means carried by said shackle unit to release said bomb; an electric control on the aircraft; means extending through said first portion of the shackle unit for releasably electrically connecting said electric control on the aircraft with said electrical actuating means on the shackle unit; mechanical means carried by said shackle unit to release said bomb independently of said electrical actuating means; a mechanical control on the aircraft structurally separate from said shackle unit; and mechanism extending through said second portion of the shackle unit to operatively connect said mechanical control on the aircraft with said mechanical means carried by the shackle unit.

32. An aircraft apparatus for use with an aerial bomb on an aircraft, said apparatus comprising: a support means mounted on the aircraft; a separable shackle unit including a casing adapted for releasable attachment to said support means at a shackle station on the support means; movable engagement means carried by said shackle unit, said engagement means being movable between a release position and an effective position to engage and support said bomb; positive latching mechanism carried by said support to receive and detachably support said shackle unit, whereby said shackle unit may be shaped and disposed to be engaged with said bomb outside the aircraft and then with the bomb attached thereto may be moved into the aircraft into engagement with said support means; yielding means in said casing to urge said engagement means to its release position; releasable means to latch said engagement means in said effective position in opposition to said yielding means, said releasable means being entirely within the confines of said casing to avoid accidental release of said engagement means while said shackle unit is supporting said bomb apart from said support means; and remote control means on said aircraft effective at said shackle station to release said latch means while said shackle unit is attached to the support means.

33. An apparatus as set forth in claim 32 including means causing said latch means automatically to engage said engagement means in response to movement of the engagement means.

34. An apparatus for use with an aerial bomb on an aircraft, said apparatus comprising: a support means mounted on the aircraft; a separable shackle unit including a casing adapted for releasable attachment with said support means at a shackle station on the support means; movable engagement means carried by said shackle unit to engage said bomb, said engagement means being shaped and disposed to be movable in response to contact with said bomb from a release position to an effective position to engage and support the bomb; positive latching mechanism carried by said support to receive and detachably support said shackle unit, whereby said shackle unit may be removed from said support means, moved into automatic engagement with said bomb, and then with the bomb attached thereto may be moved into the aircraft into engagement with said support means; means to latch said engagement means in said effective position, said casing enclosing said latch means to prevent accidental release thereof while the bomb is attached to said shackle unit in the course of moving the shackle into the aircraft; and remote control means in said aircraft effective to release said latch while said shackle unit is attached to the support means.

35. A bomb-supporting mechanism for aircraft, comprising: engagement means movable between an engagement position to engage and support a bomb and a release position to release the bomb; a first sear movable between a release position and a cocked position, the cocked sear blocking movement of said engagement means to the release position of the engagement means; a second sear movable between a release position and a cocked position, said second sear at its cocked position blocking movement of said first sear to the release position of the first sear; a control means to move said second sear to its release position, thereby to cause releasing movement of said engagement means; link means operatively connected with said first sear; and means operated by said control means to transmit force directly to said link means to accelerate the release movement of said first sear when said second sear is released.

36. A bomb-supporting mechanism for aircraft, comprising: engagement means movable between an engagement position to engage and support a bomb and a release position to release the bomb; a first sear movable between a release position and a cocked position, the cocked sear blocking movement of said engagement means to the release position of the engagement means; link means operatively connected to said first sear to form therewith a toggle mechanism; a second sear movable between a release position and a cocked position, said second sear at its cocked position blocking movement of said toggle mechanism, thereby blocking release movement of said first sear; a control means to move said second sear to its release position, thereby to cause releasing movement of said engagement means; and means operable by said control means to transmit force to said toggle mechanism to accelerate release movement of said first sear when said second sear releases the toggle mechanism.

37. A bomb-supporting mechanism for aircraft as set forth in claim 36 in which a manual cocking means is operatively connected to said toggle mechanism to move the toggle mechanism into engagement with said second sear.

38. A bomb-supporting mechanism for aircraft, comprising: engagement means movable between an engagement position to engage and support a bomb and a release position to release the bomb; a first sear movable between a release position and a cocked position, the cocked sear blocking movement of said engagement means to the release position of the engagement means; a linkage mechanism connected to said first sear, said mechanism being operable in one direction to move the first sear to its cocked position and in the opposite direction to move said first sear out of its cocked position; a second sear movable between a release position and a cocked position, said second sear at its cocked position blocking movement of said linkage mechanism in said second direction; and means to transmit force to said linkage mechanism in said opposite direction to accelerate release movement of said first sear.

39. A bomb-supporting mechanism for aircraft as set forth in claim 38 in which said force-transmitting means includes mechanical means actuated by said control means.

40. A bomb-supporting mechanism for aircraft as set forth in claim 38 in which manual cocking means is operatively connected to said linkage mechanism to move said first sear to its cocked position.

41. A bomb-supporting mechanism for aircraft as set forth in claim 38 which includes means to move said first sear to its cocked position in response to movement of said engagement means to said engagement position, thereby causing said linkage mechanism to move in said first direction into engagement with said second sear.

42. A bomb-supporting mechanism for aircraft, comprising: engagement means movable between an engagement position to engage and support a bomb and a release position to release the bomb; a sear movable between a release position and a cocked position, the cocked sear blocking movement of said engagement means to the release position of the engagement means; and latch means to releasably hold said sear in its cocked position, said engagement means being movable from its release position to its engagement position in response to forcible contact with said bomb; means connected with said engagement means to actuate said sear from its release position to its cocked position in response to movement of said engagement means to said engagement position, and said latch means being movable to its latching position in response to movement of said sear to said cocked position, whereby forcible contact of said engagement means with said bomb establishes automatic engagement with the bomb.

43. A bomb-supporting mechanism for aircraft, comprising: engagement means movable between an engagement position to engage and support a bomb and a release position to release the bomb; a sear movable between a release position and a cocked position, the cocked sear blocking movement of said engagement means to the release position of the engagement means; means to move said sear to its cocked position in response to movement of said engagement means to said engagement position; and a latch means to hold said sear in said cocked position, said latch means being linked to said sear for movement to its latched position in response to movement of said sear to said cocked position.

44. In an aircraft apparatus for aerial bombs, comprising: a frame providing an upwardly extending guide channel with a lower entrance end, there being a series of shackle stations spaced along said channel; a plurality of bomb shackles having projections for sliding engagement with said guide channel, means at said stations along said channel to pass said shackle projections in their sliding movement or to releasably engage said projections for support of said shackles, whereby the shackles loaded with bombs may be guided through said stations; means carried by said shackles for releasable engagement with a bomb, whereby a shackle may be removed from said frame for engagement with a bomb and with the bomb supported thereby may be guided up said channel to one of said shackle stations; electrical means carried by said shackles for release operation of said engagement means; a control circuit; and means to connect said control circuit with said electrical actuation means in response to the mounting of said shackle unit at a station on said frame.

45. An aircraft apparatus for aerial bombs as set forth in claim 44 in which means for mechanically releasing said engagement means in a shackle is mounted at each of said shackle stations.

46. An apparatus for use with an aerial bomb on an aircraft, comprising: a bomb rack having a plurality of bomb-release stations; a plurality of shackles; means at said stations to releasably engage said shackles; engagement mechanism in each of said shackles to releasably support a bomb; means to guide said shackles upward along predetermined paths to said stations, whereby each shackle may be attached to a bomb outside the aircraft and the bomb hoisted into the aircraft with the shackle guiding the bomb to a desired station; and a control system carried by the aircraft including means at each of said stations to actuate the engagement mechanism in the respective shackle to release a bomb at the respective station while the respective shackle is retained by said shackle engaging means.

47. An apparatus for use with an aerial bomb on an aircraft, comprising: a bomb rack having a plurality of bomb-release stations; a plurality of shackles; means at said stations to automatically releasably engage shackles in response to movement of shackles to the station; engagement mechanism in each of said shackles to releasably support a bomb; means to guide said shackles upward along predetermined paths to said stations, whereby each shackle may be attached to a bomb outside the aircraft and the bomb hoisted into the aircraft with the shackle guiding the bomb to a desired station and the bomb secured by automatic anchorage of the shackle at the desired station; and a control system carried by the aircraft effective at each of said stations to actuate the engagement mechanism in the respective shackles to release bombs at the respective stations.

48. An apparatus for use with an aerial bomb on an aircraft, comprising: a bomb rack having a plurality of bomb-release stations; a plurality of shackle casings; means at said stations to releasably engage said shackle casings; engagement mechanism in each of said shackle casings to releasably support a bomb; means to guide said shackle casings upward along predetermined paths to said stations, whereby each shackle casing may be attached to a bomb outside the aircraft and the bomb hoisted into the aircraft with the shackle guiding the bomb to a desired station; selective control means carried by the aircraft at each of said stations to actuate the engagement mechanism in said shackles; and means for selectively actuating the various selective control means at said stations.

49. An apparatus for use with an aerial bomb on an aircraft, comprising: a bomb rack having a plurality of bomb-release stations; a plurality of shackle casings having control openings; means at said stations to releasably engage said shackles; engagement mechanism in each of said casings to releasably support a bomb, said engagement mechanism being protected by the casing against accidental release but being accessible through the control opening of the casing; and a control system carried by the aircraft including selectively actuable means at each of said stations effective through said opening of the corresponding shackle casing to release the engagement mechanism in the casing.

50. An apparatus for use with an aerial bomb on an aircraft, comprising: a bomb rack having a plurality of bomb-release stations; a plurality of shackle casings having control openings; means at said stations to releasably engage said shackles; engagement mechanism in each of said casings to releasably support a bomb; means to guide said shackles upward along predetermined paths to said stations, whereby each shackle casing may be attached to a bomb outside the aircraft and the bomb hoisted into the aircraft with the shackle guiding the bomb to a desired station; and a control system carried by the aircraft including selectively actuable means at said stations effective through said openings of the corresponding shackle casings to release the engagement mechanisms in the respective casings.

51. An aircraft apparatus for aerial bombs comprising: a frame providing an upwardly extending guide channel with a lower entrance end, said guide channel providing a series of shackle stations spaced therealong; a plurality of bomb shackles having projections for sliding engagement with said guide channel for passage of said shackles through said stations when loaded with bombs; a plurality of movable engagement means respectively disposed along said channel at said schackle stations in the path of movement of said projections, said movable engagement means being adapted to yield to pass said shackle projections in an upward direction; and means loading said movable engagement means to return the latter to the path of movement of said shackle projections and block downward movement of said projections.

52. A combination as in claim 51 wherein each movable engagement means is an upwardly directed pivoted latch.

53. A combination as in claim 51 wherein a retractable stop is provided adjacent each movable engagement means in the path of movement of a shackle projection carried by the respective movable engagement means.

54. In an aircraft having a bomb bay normally closed by a door means, the combination therewith of apparatus for an aerial bomb, comprising: means to releasably support a bomb in said bomb bay; a control means movable from a normal position to a firing position preparatory to the release of said bomb; mechanical locking means normally locking said support means against release of said bomb, said locking means being movable to an unlocking position in response to movement of said control means to said firing position; means to release said bomb-supporting means when said control means is in firing position; and means to open said door means in response to movement of said control means to said firing position; arming means carried by said bomb support means; means to move said control means to a second position; and means actuable by said control means to release said arming means and release said bomb support means when said control means is moved to said second position.

CLAUDE C. SLATE.

REFERENCES CITED

The following references are of record in the file of this patent:

UNITED STATES PATENTS

| Number | Name | Date |
|---|---|---|
| 604,668 | Sample | May 24, 1898 |
| 915,623 | Parks | Mar. 16, 1909 |
| 1,311,630 | Weed | July 29, 1919 |
| 1,396,150 | Weed | Nov. 8, 1921 |
| 1,480,582 | Weed | Jan. 15, 1924 |
| 1,602,241 | Moser | Oct. 5, 1926 |
| 1,847,545 | Wiley | Mar. 1, 1932 |
| 1,893,232 | Halsey | Jan. 3, 1933 |
| 1,980,375 | Bradshaw | Nov. 13, 1934 |
| 2,193,139 | Monteith et al. | Mar. 12, 1940 |
| 2,250,240 | Steuerlein | July 22, 1941 |
| 2,278,482 | Pishvanov | Apr. 7, 1942 |
| 2,363,750 | Schmued | Nov. 28, 1944 |

FOREIGN PATENTS

| Number | Country | Date |
|---|---|---|
| 496,953 | Great Britain | Dec. 8, 1938 |
| 166,282 | Great Britain | July 11, 1921 |
| 212,036 | Great Britain | Mar. 6, 1924 |
| 218,596 | Great Britain | July 10, 1924 |
| 331,591 | Great Britain | July 7, 1930 |
| 490,027 | Great Britain | Apr. 15, 1937 |
| 490,028 | Great Britain | July 29, 1938 |
| 664,999 | France | Apr. 29, 1929 |
| 772,688 | France | Apr. 20, 1934 |
| 315,111 | Germany | Oct. 25, 1919 |
| 158,673 | Austria | Dec. 15, 1939 |

Certificate of Correction

Patent No. 2,453,869.

November 16, 1948.

CLAUDE C. SLATE

It is hereby certified that errors appear in the printed specification of the above numbered patent requiring correction as follows:

Column 23, line 34, claim 18, after the word "bombs" insert the following—
, *whereby said shackle unit may be engaged with said bomb outside the aircraft and then with the bomb attached thereto may be moved into the aircraft into engagement with said support means*;

line 48, same claim, for "bomb-releaes" read *bomb-release*; column 28, lines 19 and 20, claim 29, for the words "support an operative connection between said bomb; said" read *support said bomb; an operative connection between said*; column 29, lines 14 and 15, claim 32, strike out "movable"; lines 21 and 22, same claim, strike out "shaped and disposed to be"; column 33, line 14, claim 51, for "schackle" read *shackle*;

and that the said Letters Patent should be read with these corrections therein that the same may conform to the record of the case in the Patent Office.

Signed and sealed this 10th day of May, A. D. 1949.

[SEAL]

THOMAS F. MURPHY,
*Assistant Commissioner of Patents.*